(12) United States Patent
Yoshihiro et al.

(10) Patent No.: US 8,490,650 B2
(45) Date of Patent: Jul. 23, 2013

(54) COUPLER FOR TRANSFERRING A LIQUID OR OTHER MATERIAL BETWEEN CONTAINERS

(75) Inventors: Kenji Yoshihiro, Yokohama (JP); You Yamamori, Yokohama (JP); Hiroaki Hayashi, Yokohama (JP); Kenichi Takahashi, Yokohama (JP); Koichi Kawamura, Yokohama (JP)

(73) Assignees: Toyo Seikan Kaisha, Ltd., Tokyo (JP); Kabushiki Kaisha Toshiba, Tokyo (JP)

( * ) Notice: Subject to any disclaimer, the term of this patent is extended or adjusted under 35 U.S.C. 154(b) by 1372 days.

(21) Appl. No.: 12/087,744

(22) PCT Filed: Jan. 18, 2007

(86) PCT No.: PCT/JP2007/051117
§ 371 (c)(1),
(2), (4) Date: Jul. 11, 2008

(87) PCT Pub. No.: WO2007/083834
PCT Pub. Date: Jul. 26, 2007

(65) Prior Publication Data
US 2009/0001722 A1    Jan. 1, 2009

(30) Foreign Application Priority Data

Jan. 19, 2006  (JP) ................................. 2006-010643
Feb. 20, 2006  (JP) ................................. 2006-041854
Aug. 22, 2006  (JP) ................................. 2006-225306

(51) Int. Cl.
*F16L 37/28*    (2006.01)
(52) U.S. Cl.
USPC ................................. 137/614.04; 137/614.03

(58) Field of Classification Search
USPC ............. 137/614, 614.03–614.06; 251/149.1, 251/149.4–149.6
See application file for complete search history.

(56) References Cited

U.S. PATENT DOCUMENTS 2,896,977 A * 7/1959 Hansen .................... 137/614.04
4,942,901 A   7/1990 Vescovini
(Continued)

FOREIGN PATENT DOCUMENTS

CA  2410581 C   11/2002
EP  0 325 305 A2  7/1989
(Continued)

OTHER PUBLICATIONS

Translation of Written Opinion of International Searching Authority Dated Jul. 10, 2007.
(Continued)

*Primary Examiner* — Kevin Lee
(74) *Attorney, Agent, or Firm* — Hedman & Costigan, P.C.; James V. Costigan

(57) ABSTRACT

A coupler having a socket with a valve and an element for energizing the valve in a closing direction, and a plug having a valve and an element for energizing the valve of the plug in a closing direction, where the plug is detachably fitted and coupled with the socket and is capable of communicating with the socket by opening the valve of the plug and the valve of the socket in the fitted and coupled state,
A key groove or a key is provided in either the socket or the plug, and a ring member having a key or a key groove which can be fitted with the key groove or the key is provided in the other of the socket and the plug and the ring member is rotatable about a central axis of connection of the socket and the plug.

9 Claims, 24 Drawing Sheets

U.S. PATENT DOCUMENTS

| | | | |
|---|---|---|---|
| 5,009,252 A * | 4/1991 | Faughn | 137/614.04 |
| 5,848,997 A | 12/1998 | Erskine | |
| 5,971,019 A | 10/1999 | Imai | |
| 6,196,522 B1 * | 3/2001 | Yuen et al. | 251/149.5 |
| 7,887,023 B2 * | 2/2011 | Hasunuma | 137/614.06 |
| 2002/0136086 A1 | 9/2002 | Gill | |

FOREIGN PATENT DOCUMENTS

| | | |
|---|---|---|
| JP | 58-46751 A | 3/1983 |
| JP | 2-118276 A | 5/1990 |
| JP | 3-60685 | 6/1991 |
| JP | 6-50483 A | 2/1994 |
| JP | 7-2696 A | 1/1995 |
| JP | 7-35282 A | 2/1995 |
| JP | 7-32284 A | 6/1995 |
| JP | 8-86390 A | 4/1996 |
| JP | 9-327519 A | 12/1997 |
| JP | 11-193894 | 7/1999 |
| JP | 11-334758 A | 12/1999 |
| JP | 2001-369594 A | 12/2001 |
| JP | 2003-297700 A | 8/2003 |
| JP | 2004-518514 A | 6/2004 |
| JP | 2005-71713 A | 3/2005 |
| JP | 2005-259364 A | 9/2005 |

OTHER PUBLICATIONS

Office Action Issued by Japanese Patent Office on Nov. 8, 2011 in Corresponding JP Application 2006-225306.

Office Action Issued by Japanese Patent Officeon Jun. 28, 2011 in Corresponding JP Application 2006-010643.

Office Action Issued by Japanese Patent Office on Jun. 23, 2011 in Corresponding JP Application 2006-041854.

* cited by examiner

A-A SECTION

B-B SECTION

A-A SECTION

B-B SECTION

FIG. 5A1  FIG. 5A2  FIG. 5A3  FIG. 5A4
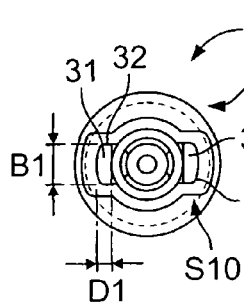 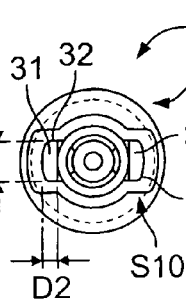 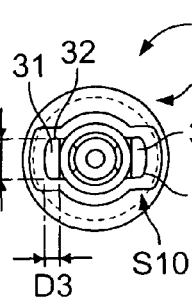 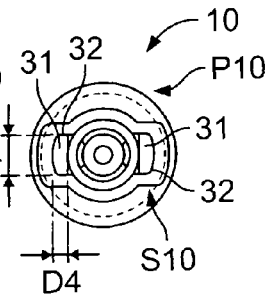
FIG. 5B1  FIG. 5B2  FIG. 5B3  FIG. 5B4
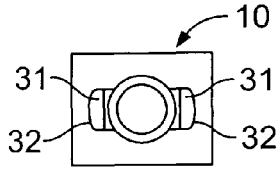 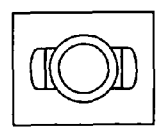 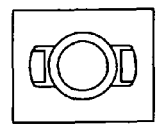 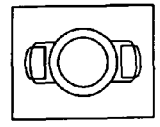
FIG. 5C1  FIG. 5C2  FIG. 5C3  FIG. 5C4
 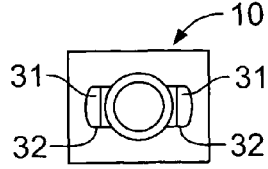 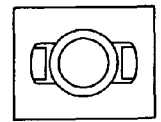 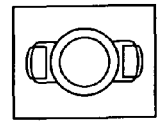
FIG. 5D1  FIG. 5D2  FIG. 5D3  FIG. 5D4
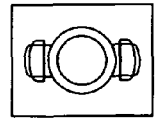 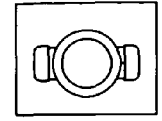 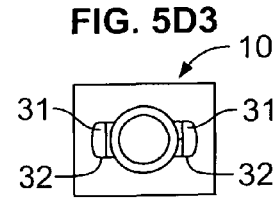 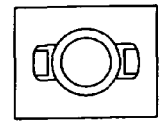
FIG. 5E1  FIG. 5E2  FIG. 5E3  FIG. 5E4
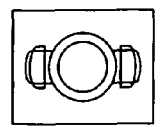 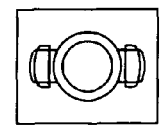 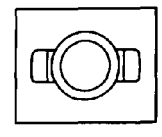 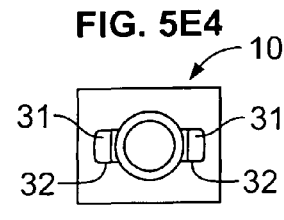

FIG.6A
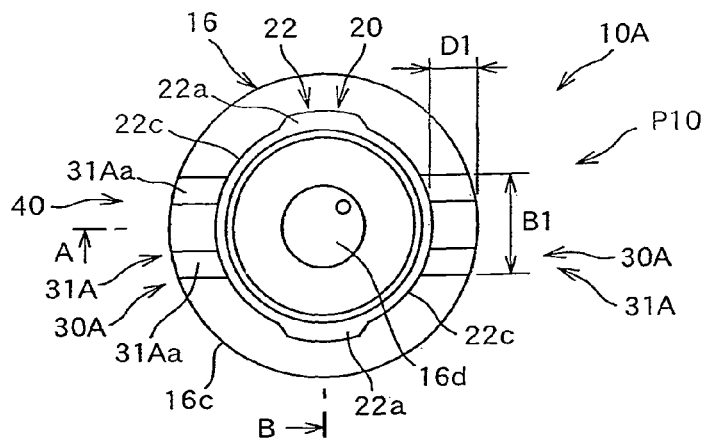
FIG.6B
FIG.6C
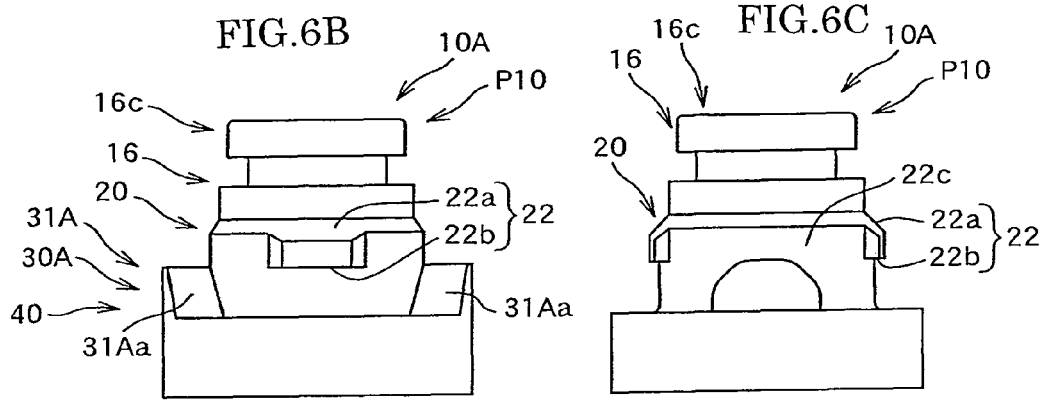
FIG.6D
A-O-B SECTION
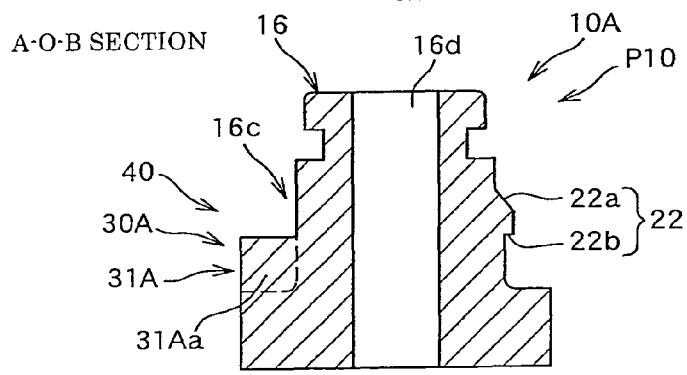

FIG.10A
FIG.10B
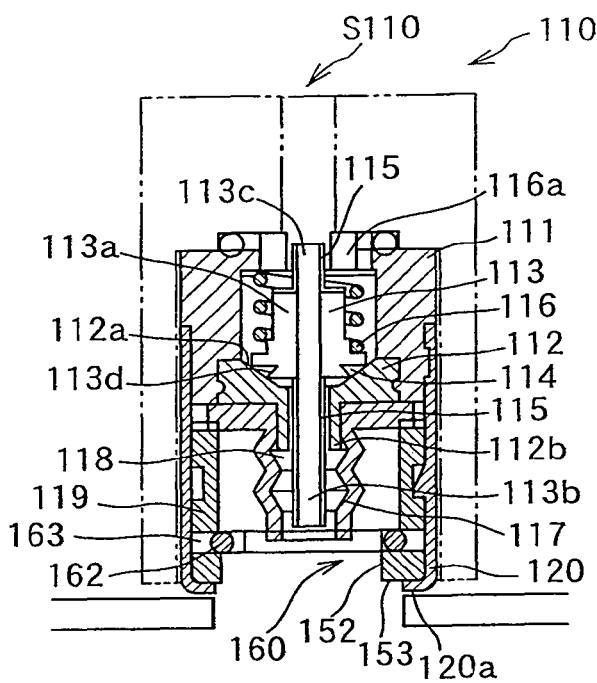
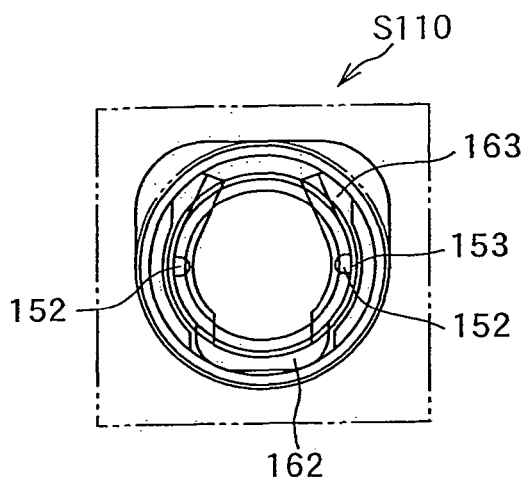
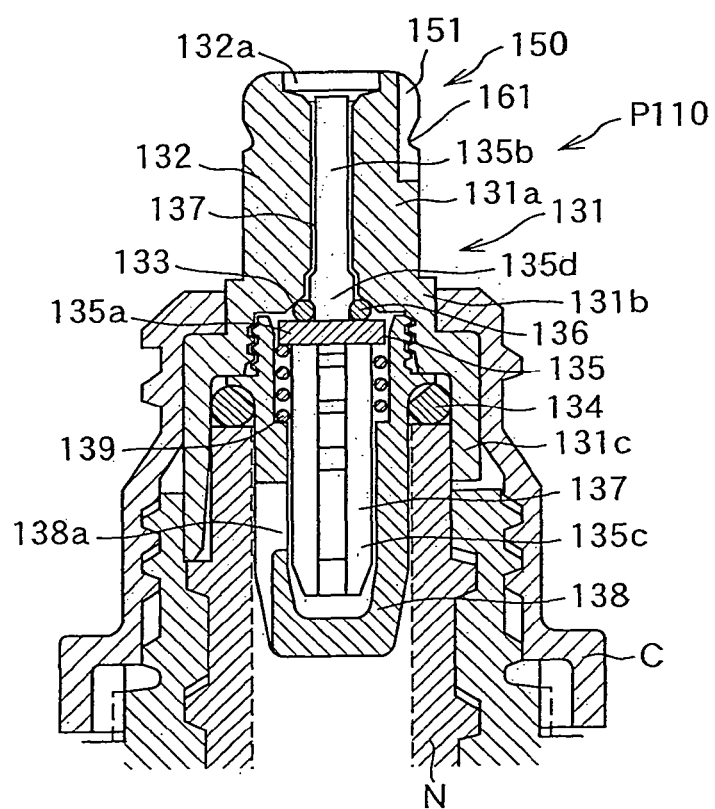

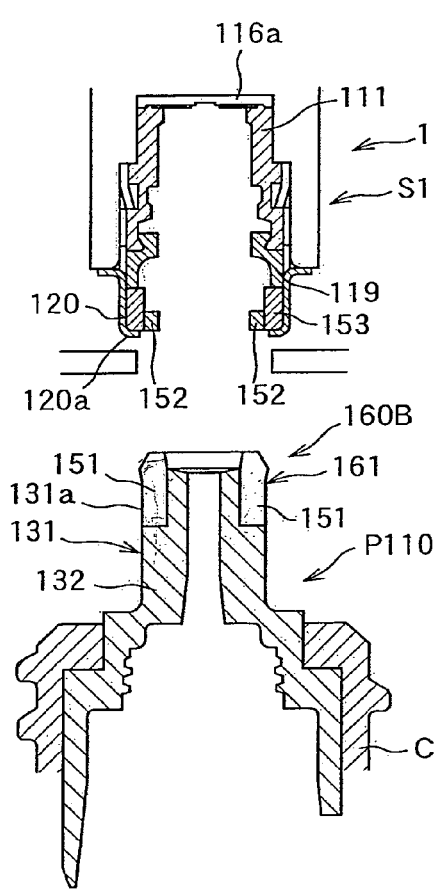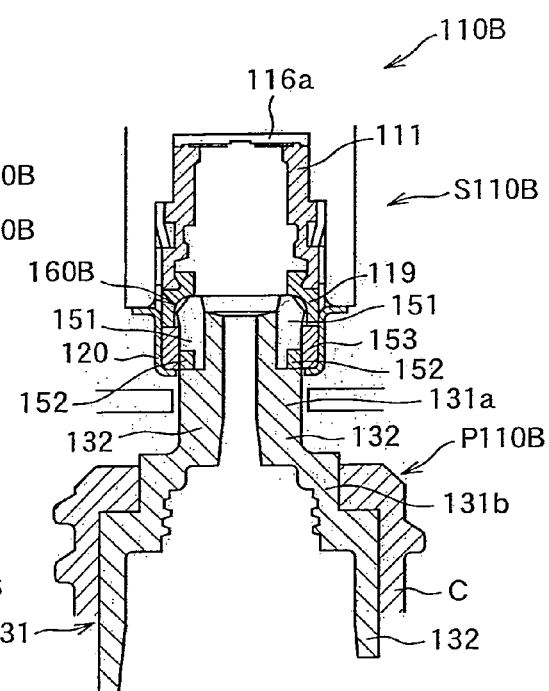

FIG.16A
FIG.16B
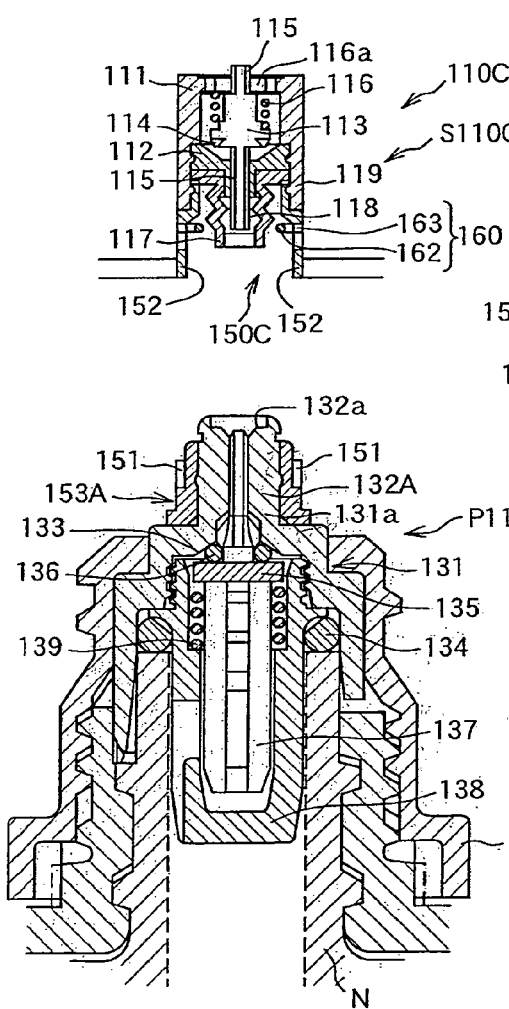
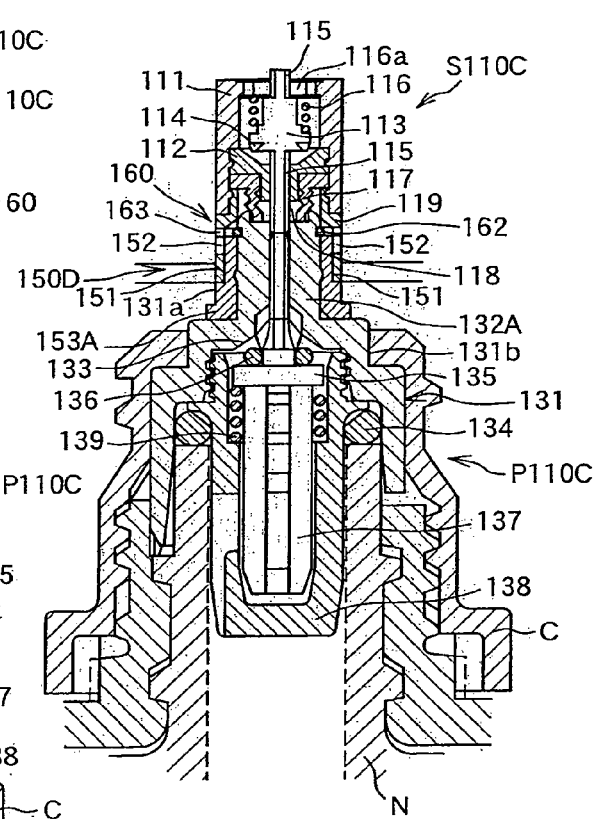

FIG.18A
FIG.18B
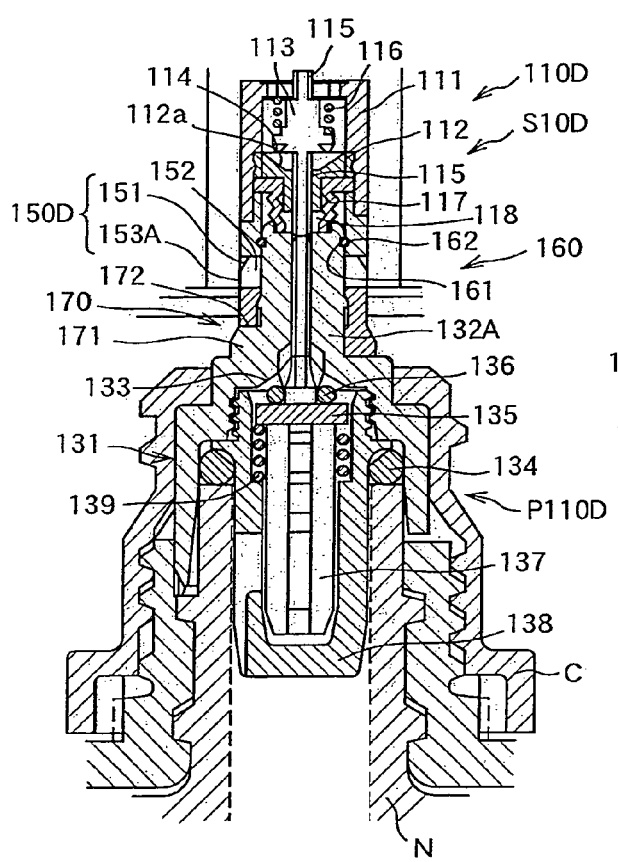
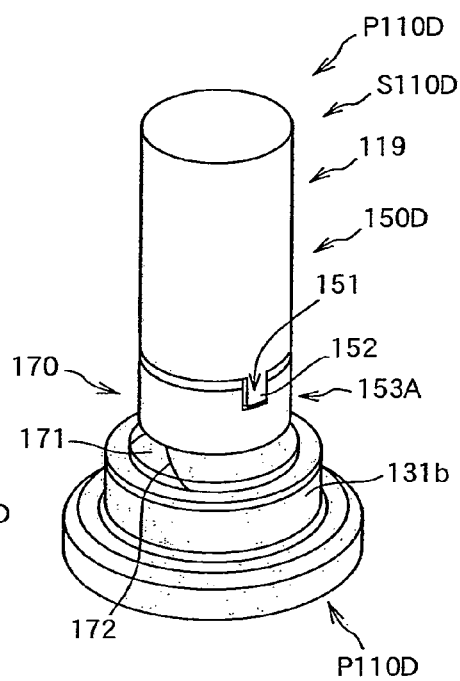

FIG.20A
FIG.20B
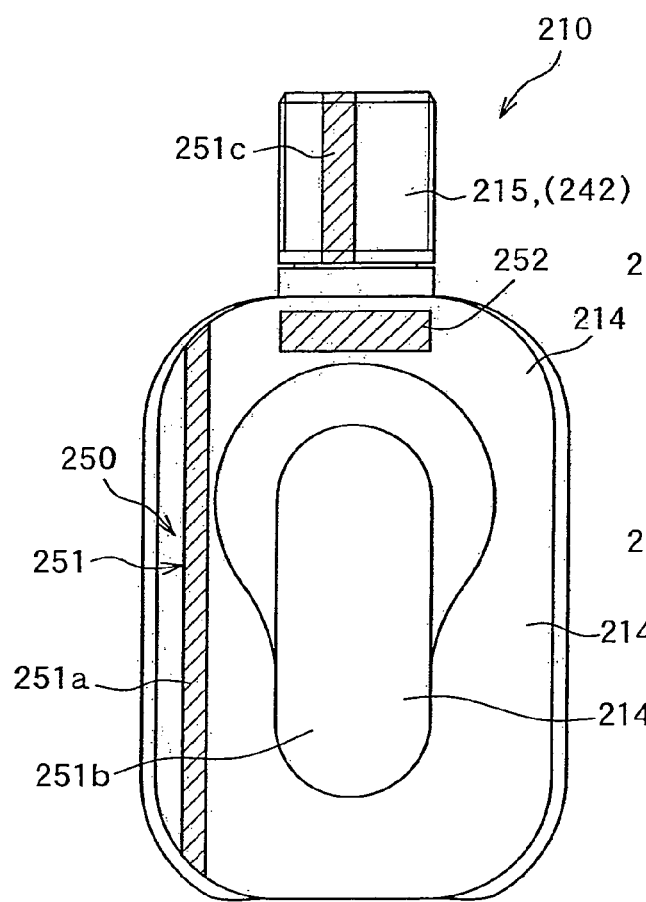
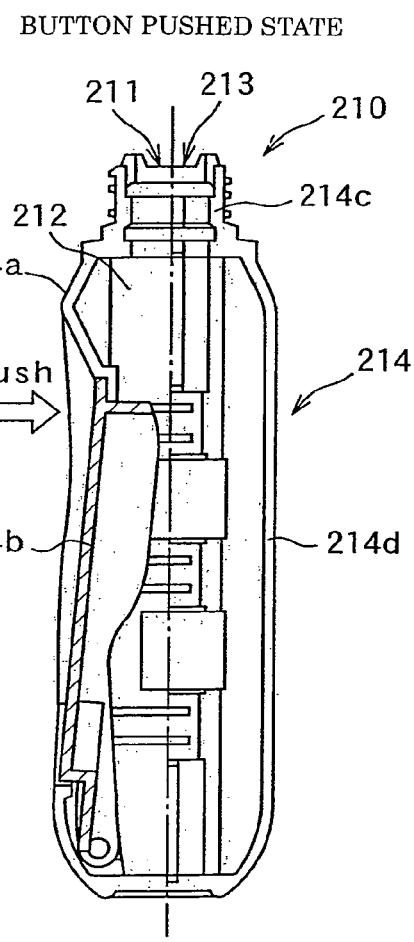

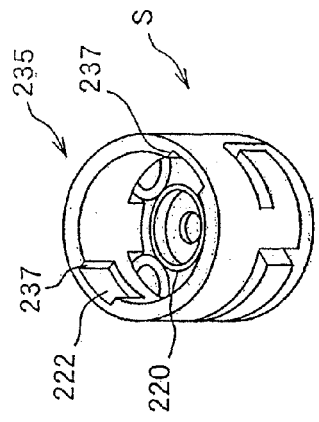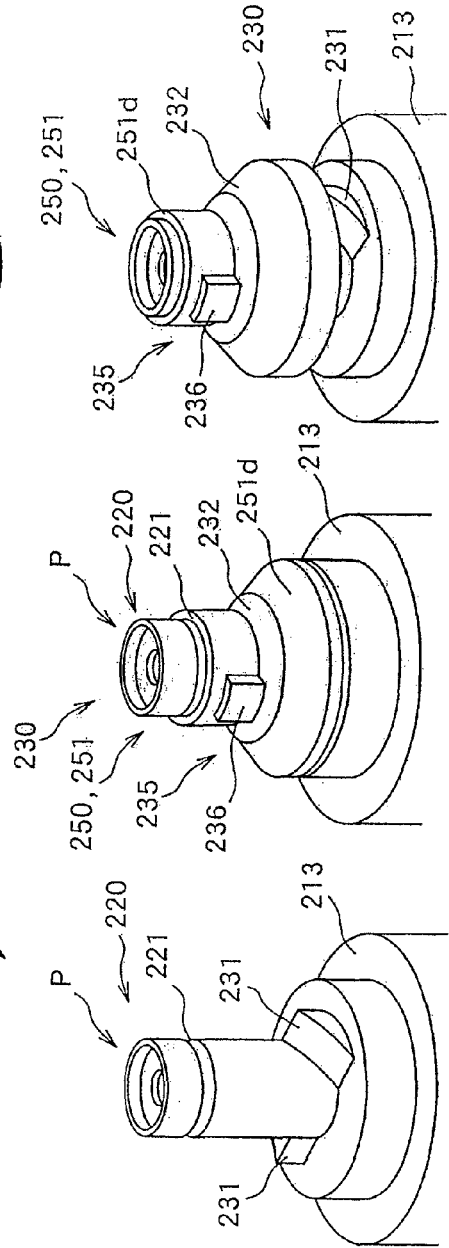
FIG.23A  FIG.23B
FIG.23C  FIG.23D  FIG.23E
NORMAL STATE  CAM OPERATING STATE

COUPLER FOR TRANSFERRING A LIQUID OR OTHER MATERIAL BETWEEN CONTAINERS

TECHNICAL FIELD

This invention relates to a coupler consisting of a socket and a plug which are detachably coupled to each other and, more particularly, to a coupler of this type by which liquid or other material can be easily and accurately shifted from a container to another container provided on the side of a main body or, alternatively, a container containing such liquid or other material can be exchanged per se by another one and which can be released easily without causing damage when excessive rotational force is applied in the coupled state. This coupler is particularly suitable when it is used as a coupler provided between a cartridge container for a methanol fuel cell and a fuel cell main body.

BACKGROUND ART

There are many cases where it is necessary to supplement liquid such as a raw material which decreases by operation or use of an equipment or apparatus. In such cases, supply of liquid such as a raw material is made by coupling a cartridge container to a container provided on the side of a main body of an equipment or apparatus for shifting the liquid between the two containers or by exchanging a container provided on the main body with another container.

Various detachable types of couplers are used for simply performing such coupling or exchanging between two containers.

For example, Japanese Patent Application Laid-open Publication No. 2003-172487 discloses in its FIG. 9 a coupling device which consists of a plug P having a main flow path and a sub-flow path and a socket S having a main flow path and a sub-flow path and being connectable to the plug and being capable of communicating with the main flow path and the sub-flow path of the plug in a coupled state.

According to this coupling device, the socket S comprises a main flow-path $2a$ formed outside of the outer periphery of a valve pusher 2 fixed to a holder 1, a sub-flow path $2b$ formed further outside of the main flow path $2a$, and valves $3a$ and $3b$ for closing the flow paths $2a$ and $2b$. The respective valves $3a$ and $3b$ are pushed toward their valve seats by energizing force of springs $4a$ and $4b$ to close the main flow path $2a$ and the sub-flow path $2b$.

The plug P comprises a main flow path $6a$ formed outside of the periphery of a valve main body 6 held slidably by a valve holder 5, a sub-flow path $6b$ formed outside of the main flow path $6a$, and valves $7a$ and $7b$ for closing the flow paths $6a$ and $6b$. The respective valves $7a$ and $7b$ are pushed toward their valve seats by energizing force of springs $8a$ and $8b$ to close the main flow path $6a$ and the sub-flow path $6b$.

When the socket S is connected to the plug P, the sub-valve $3b$ of the socket S abuts against the sub-valve $7b$ of the plug P and these valves $3b$ and $7b$ are displaced in a direction to separating apart from each other against the force of the springs $4b$ and $8b$ thereby causing the sub-flow paths $2b$ and $6b$ to communicate with each other.

As the socket S is further connected to the plug P, the main valve $3a$ of the socket S is pushed by the end surface of an inner cylinder of the plug P to withdraw from the valve seat of the valve pusher 2 against the force of the spring $4a$ and thereby open the main flow path $2a$ relative to the valve pusher 2. Simultaneously, the end surface of the valve pusher of the socket S abuts against the surface of the valve provided on the valve main body 6 of the plug P and thereby the valve main body 6 of the plug P is pushed against the force of the spring $8a$ to cause the valve main body 6 to retreat and thereby open the main valve $7a$ to communicate with the main flow path $6a$.

By this arrangement, when the sub-flow path is communicated, gas is supplied from a gas supply source to the inside of the container and an inner bag provided in the container is contracted to supply liquid in the inner bag from the main flow path of the plug to the outside of the container through the main flow path of the socket.

Various liquid type fuel cells which can generate electricity directly from liquid fuel have recently been developed. A direct methanol fuel cell (DMFC) which uses methanol as its fuel has drawn attention as for its use as a power source of portable type electronic devices, for it can be made compact without using a reforming device.

Particularly, in a passive type direct methanol fuel cell (DMFC), methanol is supplemented directly by coupling a fuel cartridge containing methanol which is liquid fuel to a fuel tank provided on the side of a fuel cell main body whereby a pump for supplying fuel becomes unnecessary and the fuel cell can be made further compact (Japanese Patent Application Laid-open Publication No. 2005-71713).

In an active type fuel cell, a pump mechanism is provided on the side of a fuel cell main body and the fuel cell is coupled to a fuel cartridge containing methanol and methanol is pumped out of the fuel cartridge by the pump mechanism and supplied to a fuel tank.

In both types of the methanol fuel cells, various methanol aqueous solutions as well as pure methanol of different concentrations are used as methanol as the fuel. Further, in some fuel cells, not only methanol fuel but also ethanol fuel such as ethanol aqueous solutions and pure ethanol and also other fuels including dimethyl ether and formic acid are used.

DISCLOSURE OF THE INVENTION

In a case where a coupler such as one disclosed in the above described Japanese Patent Application Laid-open Publication No. 2003-172487 is used as a coupler for supplementing fuel to a methanol fuel cell or a coupler for supplementing fuel by exchanging a container per se by another container, a coupler must be one which can be coupled accurately with a simple operation and also one which can be released from coupling easily without causing damage to the coupler or devices of a main body when excessive force beyond a normal range of use is applied in the coupled state of the coupler.

Further, in a case where concentration (purity) of methanol which is required according to the specification of a methanol fuel cell is not constant but various concentrations of methanol are required, there is need for developing a coupler which can be coupled with a simple operation and which can supply only fuel of a specific concentration matching the specification of each methanol fuel cell without supplying fuel of a wrong concentration.

It is, therefore, a first object of the invention to provide a coupler which can be coupled accurately with a simple operation and, when excessive force beyond a normal range of use is applied, can be released from the coupled state before it is damaged. Additionally, only one set of coupler should preferably be discriminated for coupling.

If liquid fuel for a fuel cell such as one disclosed in the above described Japanese Patent Application Laid-open Publication No. 2003-172487 is filled in a fuel cartridge and sold in various concentrations in the market, there is likelihood that a wrong kind of liquid fuel may be erroneously supplied with resulting malfunction of the fuel cell.

Therefore, it is desirable to develop a fuel cartridge for a fuel cell which can be discriminated easily depending upon the type of fuel to be used.

It is therefore a second object of the invention to provide a fuel cartridge for a fuel cell which can be discriminated easily depending upon the type of fuel to be used.

For achieving the first object of the invention, in the first aspect of the invention, there is provided a coupler comprising a socket having a valve and energizing means for energizing the valve in a closing direction, and a plug having a valve and energizing means for energizing the valve of the plug in a closing direction, said plug being detachably fitted and coupled with the socket and being capable of communicating with the socket by opening the valve of the plug and the valve of the socket in the fitted and coupled state, wherein a cam portion which inclines in substantially a circumferential direction with a central axis extending in the direction of coupling is provided in one of the socket and the plug and a cam follower portion which is free of contact with the cam portion until the fitted and coupled state is brought about in the other of the socket and the plug in such a manner that the coupling is released when an excessive rotational force is applied.

According to this coupler, a cam portion which inclines in substantially a circumferential direction with a central axis extending in the direction of coupling is provided in one of the socket and the plug and a cam follower portion which is free of contact with the cam portion until the fitted and coupled state is brought about in the other of the socket and the plug and, the coupling is automatically released with the cam and the cam follower when an excessive rotational force which exceeds a normal range of use is applied.

By this arrangement, in supplying methanol in the container to a methanol fuel cell or exchanging the container per se, accurate coupling can be ensured and coupling can be accurately released against an excessive force before damage occurs.

In the second aspect of the invention, there is provided a coupler as defined in the first aspect wherein coupling holding means for holding coupling is provided between the socket and the plug.

According to this coupler, by providing coupling holding means for holding coupling between the socket and the plug, coupling between the socket and the plug can be accurately maintained.

In the third aspect of the invention, there is provided a coupler as defined in the first or second aspect wherein the cam portion is formed as a cam surface which projects and inclines on the plug and the cam follower portion is formed as a cam follower groove of the socket in which the cam surface is fitted.

According to this coupler, the cam portion is formed as a cam surface which projects and inclines on the plug and the cam follower portion is formed as a cam follower groove of the socket in which the cam portion is fitted and, therefore, when an excessive force in the direction of rotation is applied to the socket and the plug which are coupled in a straight direction, a separating force acts with the cam surface which inclines in substantially the circumferential direction and the cam follower groove of the socket thereby to release coupling automatically and, also, coupling operation can be performed accurately by watching both the projecting cam surface and the recessed cam follower groove.

In the fourth aspect of the invention, there is provided a coupler as defined in any of the first to third aspects wherein a plurality of the cam portions and a plurality of the cam follower portions are provided in the circumferential direction so that coupling is released regardless of the direction of the excessive rotational force.

According to this coupler, since a plurality of the cam portions and a plurality of the cam follower portions are provided in the circumferential direction, coupling can be released regardless of the direction of the excessive rotational force exceeding a normal range of use, i.e., regardless of whether it is a rotational force in a clockwise direction or in a counterclockwise direction.

In the fifth aspect of the invention, there is provided a coupler as defined in any of the first to fourth aspects wherein the cam portion is provided integrally in one of a projecting coupling portion of the plug or a plug coupling opening of the socket and the cam follower portion is provided integrally in the other of the projecting coupling portion of the plug and the plug coupling opening of the socket.

According to this coupler, since the cam portion is provided integrally in one of a projecting coupling portion of the plug or a plug coupling opening of the socket and the cam follower portion is provided integrally in the other of the projecting coupling portion of the plug and the plug coupling opening of the socket, the plug and the socket can be made in a further compact design.

In the sixth aspect of the invention, there is provided a coupler wherein the coupling holding means comprises an engaging recess provided in either of the plug and the socket and an engaging projection provided in the other of the plug and the socket, said engaging projection being capable of engaging the engaging recess by an overriding operation and the engaging projection and the engaging recess being kept in engagement with each other in the coupled state of the plug with the socket.

According to this coupler, since the coupling holding means comprises an engaging recess provided in either of the plug and the socket and an engaging projection provided in the other of the plug and the socket, said engaging projection being capable of engaging the engaging recess by an overriding operation and the engaging projection and the engaging recess being kept in engagement with each other in the coupled state of the plug with the socket, while the coupled state by engagement can be maintained, the coupling can be released against a large force exceeding a normal range of use by the overriding operation.

In the seventh aspect of the invention, there is provided a coupler as defined in the sixth aspect wherein a recessed portion is formed by removing a part of the engaging recess and the engaging projection in the circumferential direction.

According to this coupler, by forming a recessed portion by removing a part of the engaging recess and the engaging projection in the circumferential direction, engaging force for holding coupling and force necessary for releasing coupling can be adjusted depending upon the size of the recessed portion.

In the eighth aspect of the invention, there is provided a coupler as defined in any of the first to seventh aspects wherein the plug and the socket are provided with discrimination means for enabling coupling of only one set of the plug and the socket.

According to this coupler, by providing the plug and the socket with discrimination means for enabling coupling of only one set of the plug and the socket, only one set of the plug and the socket can be coupled simply and easily by the discrimination means.

In the ninth aspect of the invention, there is provided a coupler as defined in the eighth aspect wherein said discrimination means is provided in the cam portion and the cam follower portion in such a manner that vertical and lateral lengths of the cam portion and the cam follower portion on a plane crossing the coupling direction of the plug and the socket are changed.

According to this coupler, since the discrimination means is provided in the cam portion and the cam follower portion in such a manner that vertical and lateral lengths of the cam portion and the cam follower portion on a plane crossing the coupling direction of the plug and the socket are changed, discrimination capability can be imparted by varying the vertical and lateral lengths, and not depth, of the cam portion and the cam follower portion.

In the tenth aspect of the invention, there is provided a coupler as defined in the eighth or ninth aspect wherein said discrimination means is provided by combination of changed diameters of the plug coupling opening of the socket and the projecting coupling portion of the plug.

According to this coupler, since the discrimination means is provided by combination of changed diameters of the plug coupling opening of the socket and the projecting coupling portion of the plug, discriminating capability is imparted by, in addition to varying the vertical and lateral lengths, and not depth, combining variation of the diameter of the foremost end portion of the plug and variation of the diameter of the opening of the socket which is coupled with the plug.

In the eleventh aspect of the invention, there is provided a coupler as defined in any of the first to tenth aspects wherein the socket and the plug can be discriminated by providing a discriminating section of the same color to the socket and the plug.

According to this coupler, since the socket and the plug can be discriminated by providing a discriminating section of the same color to the socket and the plug, the socket and the plug can be visually discriminated.

In the twelfth aspect of the invention, there is provided a coupler comprising a socket having a valve and energizing means for energizing the valve in a closing direction, and a plug having a valve and energizing means for energizing the valve of the plug in a closing direction, said plug being detachably fitted and coupled with the socket and being capable of communicating with the socket by opening the valve of the plug and the valve of the socket in the fitted and coupled state, wherein a key groove or a key is provided in one of the socket and the plug, and a ring member having a key or a key groove which can be fitted with the key groove or the key is provided in the other of the socket and the plug, said ring member being rotatable about a central axis of connection of the socket and the plug.

According to this coupler, since a key groove or a key is provided in one of the socket and the plug, and a ring member having a key or a key groove which can be fitted with the key groove or the key is provided in the other of the socket and the plug, said ring member being rotatable about a central axis of connection of the socket and the plug, the socket can be discriminated from the socket with the key groove and the key and, when an excessive rotational force exceeding a normal range of use is applied, application of the excessive force can be prevented by rotating the ring member.

By this arrangement, in supplying methanol in the container to the fuel cell or exchanging the container per se, predetermined plug and socket can be accurately coupled and damage by an excessive rotational force can be prevented.

In the thirteenth aspect of the invention, there is provided a coupler as defined in the twelfth aspect wherein coupling holding means for holding coupling is provided between the socket and the plug.

According to this coupler, since coupling holding means for holding coupling is provided between the socket and the plug, coupling between the socket and the plug can be accurately maintained.

In the fourteenth aspect of the invention, there is provided a coupler as defined in the thirteenth aspect wherein the coupling holding means is provided between the key groove provided in one of the socket and the plug and the key provided in the other of the socket and the plug.

According to this coupler, since the coupling holding means is provided between the key groove provided in one of the socket and the plug and the key provided in the other of the socket and the plug, it is easy to secure space for providing the coupling holding means and a compact design becomes possible.

In the fifteen aspect of the invention, there is provided a coupler as defined in the twelfth or thirteenth aspect wherein the coupling holding means is provided between the ring member provided in one of the socket and the plug and the other of the socket and the plug.

According to this aspect, by providing the coupling holding means by utilizing the ring member of one of the plug and the socket and providing the coupling holding means between the ring member and the other of the plug and the socket, the ring member can be utilized as one of the members for constituting the holding coupling means and the construction thereby can be simplified.

In the sixteenth aspect of the invention, there is provided a coupler as defined in any of the twelfth to fifteenth aspects wherein the coupling holding means comprises an engaging portion which is provided in one of the socket and the plug and an elastic engaging member which can engage with the engaging portion and is provided in the other of the socket and the plug.

According to this coupler, since the coupling holding means comprises an engaging portion which is provided in one of the socket and the plug and an elastic engaging member which can engage with the engaging portion and is provided in the other of the socket and the plug, the engaging portion can be engaged for coupling or can be disengaged for releasing coupling by utilizing elastic deformation of the elastic engaging member.

In the seventeenth aspect of the invention, there is provided a coupler as defined in any of the twelfth to sixteenth aspects wherein discrimination means for discriminating the socket and the plug is provided between the key groove and the key.

According to this coupler, since discrimination means for discriminating the socket and the plug is provided between the key groove and the key, the socket and the plug can be discriminated by changing the shape, position or number of the key groove and the key.

In the eighteenth aspect of the invention, there is provided a coupler as defined in any of the twelfth to seventeenth aspects wherein the ring member is divided in a plurality of portions in the circumferential direction and is provided with elastic connecting means for connecting and holding the divided portions of the ring member.

According to this coupler, since the ring member is divided in a plurality of portions in the circumferential direction and is provided with elastic connecting means for connecting and holding the divided portions of the ring member, the divided ring portions of the ring member which are connected elastically can be deformed in a direction in which the ring member can be opened and, therefore, damage can be prevented not only against rotational force but against an excessive force in a bending direction.

In the nineteenth aspect of the invention, there is provided a coupler as defined in any of the twelfth to eighteenth aspects wherein rotation resisting means is provided between the ring member provided in one of the socket and the plug and the other of the socket and the plug, said rotation resisting means resisting rotation when it is immobilized and being capable of being rotated when excessive rotational force is applied.

According to this coupler, since rotation resisting means is provided between the ring member provided in one of the socket and the plug and the other of the socket and the plug, said rotation resisting means being difficult to be rotated when it is held down and being capable of being rotated when excessive rotational force is applied, in coupling the socket with the plug, coupling can be made easily by holding down the rotation restricting means and thereby restricting rotation while damage can be prevented against an excessive rotational force by rotation of the rotation restricting means.

In the twentieth aspect of the invention, there is provided a coupler as defined in any of the twelfth to the nineteenth aspects wherein a cam mechanism is provided between the plug and the socket, said cam mechanism being capable of releasing the socket and the plug from coupling by rotating the coupled socket and the plug in relative rotation about a central axis.

According to this coupler, since a cam mechanism is provided between the plug and the socket, said cam mechanism being capable of releasing the socket and the plug from coupling by rotating the coupled socket and the plug in relative rotation about a central axis, when an excessive rotational force exceeding a normal range of use is applied, the rotational force can be converted to an axial force by rotating the coupled socket and the plug in relative rotation about a central axis whereby coupling can be automatically released.

In the twenty-first-aspect of the invention, there is provided a coupler as defined in the twentieth aspect wherein a cam of the cam mechanism is made of an end surface cam and is provided on the side of the key groove or the key and a cam follower following the end surface cam is provided in the ring member on the side of the key or the key groove.

According to this coupler, since a cam of the cam mechanism is made of an end surface cam and is provided on the side of the key groove or the key and a cam follower following the end surface cam is provided in the ring member on the side of the key or the key groove, a part of the cam mechanism is made of the end surface cam provided in the ring member or the cam follower and therefore the cam mechanism can be made with a simplified design.

For achieving the second object of the invention, in the twenty-second aspect of the invention, there is provided a fuel cartridge for a fuel cell for supplying fuel to a fuel tank of a fuel cell main body generating electricity by using liquid fuel comprising component parts which consist at least of a main body container housing liquid fuel and having a connection nozzle section; a connector being provided in the connection nozzle section of the main body container, capable of being detachably connected to the fuel tank of the fuel cell main body, and comprising liquid fuel discrimination key means; and a cap covering the connection nozzle section of the main body container, said cartridge comprising contents display means for displaying contents according to the type of the fuel cell which is provided in at least an outer surface portion, or a portion which is exposed to the outside in use, of one of the main body container, the connector and the cap which are the component parts of the fuel cartridge.

According to this fuel cartridge for a fuel cell, in a fuel cartridge for a fuel cell for supplying fuel to a fuel tank of a fuel cell main body generating electricity by using liquid fuel, contents display means for displaying contents according to the type of the fuel cell is provided in at least an outer surface portion, or a portion which is exposed to the outside in use, of one of the main body container, the connector and the cap which are the component parts of the fuel cartridge and, therefore, the type of the fuel can be discriminated in a simple manner by the contents display means provided in the outer surface portion while the type of the fuel can be discriminated in a simple manner in a state immediately before use by the contents display means provided in the portion which is exposed to the outside in use.

By this arrangement, when the liquid fuel for a fuel cell is contained in the fuel cartridge and sold and otherwise used, erroneous supply of a wrong type of fuel can be prevented with the result that occurrence of malfunction in the fuel cell can be prevented.

In the twenty-third aspect of the invention, there is provided a fuel cartridge for a fuel cell as defined in the twenty-second aspect wherein the main body container constitutes an inner container; the fuel cartridge further comprises an outer container having rigidity sufficient for housing the inner container therein; the cap covering the outer container or the connection nozzle section of the inner container; and the contents display means displaying contents according to the type of the fuel cell is provided in at least an outer surface portion, or a portion which is exposed to the outside in use, of the inner container, the connector, the outer container and the cap which are the component parts of the fuel cartridge.

According to this fuel cartridge for a fuel cell, since the main body container constitutes an inner container; the fuel cartridge further comprises an outer container having rigidity sufficient for housing the inner container therein; the cap covering the outer container or the connection nozzle section of the inner container; and the contents display means displaying contents according to the type of the fuel cell is provided in at least an outer surface portion, or a portion which is exposed to the outside in use, of the inner container, the connector, the outer container and the cap which are the component parts of the fuel cartridge, although the cartridge comprises the inner container and the outer container, the type of the fuel can be discriminated in a simple manner in a normal use by the contents display means provided in the outer surface portion while the type of the fuel can be discriminated in a simple manner in a state immediately before use by the contents display means provided in the portion which is exposed to the outside in use.

In the twenty-fourth aspect of the invention, there is provided a fuel cartridge for a fuel cell as defined in the twenty-second or twenty-third aspect wherein the contents display means comprises a colored portion and/or a Braille display portion which corresponds to the type or concentration or other characteristic of the fuel.

According to this cartridge, since the contents display means comprises a colored portion and/or a Braille display portion which corresponds to the type or concentration or other characteristic of the fuel, the characteristic of the fuel such as the type or concentration of the fuel can be discriminated in a simple manner by both the colored portion and the Braille portion, or by either the colored portion or the Braille portion.

In the twenty-fifth aspect of the invention, there is provided a fuel cartridge for a fuel cell as defined in any of the twenty-second to twenty-fourth aspects wherein the contents display means is provided in one of the component parts which is free of contact with liquid fuel in use.

According to this fuel cartridge for a fuel cell, since the contents display means is provided in one of the component parts which is free of contact with liquid fuel in use, the contents display means is not influenced by contact with the fuel such as solving of metal ion from a coloring agent to the fuel and, therefore, the scope of selection of the coloring agent which can be used is enlarged.

In the twenty-sixth aspect of the invention, there is provided a fuel cartridge for a fuel cell as defined in any of the twenty-second to twenty-fifth aspects wherein the contents display means is provided also in the fuel cell main body.

According to this fuel cartridge for a fuel cell, since the contents display means is provided also in the fuel cell main body, the type of fuel to be used can be more accurately made by the contents display means provided in the fuel cell main body in addition to the contents display means provided in the fuel cartridge.

In the twenty-seventh aspect of the invention, there is provided a fuel cartridge for a fuel cell as defined in any of the twenty-third to twenty-sixth aspects wherein the inner container is made of a synthetic resin squeeze bottle having flexibility and the outer container houses the inner container and is capable of pressing the inner container to push out the liquid fuel.

According to this fuel cartridge for a fuel cell, since the inner container is made of a synthetic resin squeeze bottle having flexibility and the outer container houses the inner container and is capable of pressing the inner container to push out the liquid fuel, by pressing a part of the inner container made of a synthetic resin squeeze bottle through the outer container, the liquid fuel can be pushed out and, therefore, the fuel can be supplied without using a pump.

In the twenty-eighth aspect of the invention, there is provided a fuel cartridge for a fuel cell as defined in any of the twenty-third to twenty-sixth aspects wherein the inner container is formed in a bag to which the connector is attached in one end portion thereof and said fuel cartridge further comprises a pump means provided between the connector and the fuel tank of the fuel cell main body which pumps out liquid contents contained in the inner container and supplies the liquid contents to the fuel tank.

According to this fuel cartridge for a fuel cell, since the inner container is formed in a bag to which the connector is attached in one end portion thereof and said fuel cartridge further comprises a pump means provided between the connector and the fuel tank of the fuel cell main body which pumps out liquid contents contained in the inner container and supplies the liquid contents to the fuel tank, the liquid fuel can be pumped out of the inner cartridge in the form of a bag and supplied to the fuel tank having the pump means.

In the twenty-ninth aspect of the invention, there is provided a fuel cartridge for a fuel cell as defined in any of the twenty-second to twenty-eighth aspects which further comprises a key member which is formed separately from the connector, affixed with the liquid fuel discrimination means and is disposed about the connector.

According to this fuel cartridge for a fuel cell, since a key member is formed separately from the connector, affixed with the liquid fuel discrimination means and is disposed about the connector, discrimination of liquid fuel can be made in a simple manner by the key member and it is also possible to display contents by utilizing this key member.

In the thirtieth aspect of the invention, there is provided a fuel cartridge for a fuel cell as defined in the twenty-ninth aspect wherein the key member is made of a ring member which is rotatable about the central axis of the connector.

According to this fuel cartridge for a fuel cell, since the key member is made of a ring member which is rotatable about the central axis of the connector, discrimination of liquid fuel can be made in a simple manner by the ring member which is formed separate from the connector and it is also possible to display contents by utilizing this ring member.

In the thirty-first aspect of the invention, there is provided a fuel cartridge for a fuel cell as defined in any of the twenty-second to thirtieth aspects which further comprises a cam mechanism provided on either the connector or the ring member which does not function in a non-coupled state and can be released from coupling by applying excessive rotational force.

According to this fuel cartridge for a fuel cell, since a cam mechanism is provided on either the connector or the ring member which does not function in a non-coupled state and can be released from coupling by applying excessive rotational force, coupling can be released by the cam mechanism provided on either the connector or the ring member when an excessive rotational force is applied and damage to the connector or the fuel cell main body can thereby be prevented and it is also possible to display contents by utilizing this cam mechanism.

In the thirty-second aspect of the invention, there is provided a fuel cartridge for a fuel cell as defined in any of the twenty-third to twenty-seventh and twenty-ninth to thirty-first aspects wherein the outer container is formed in such a manner that the inner container can be housed without the connector in the outer container and the outer container comprises a push button for pushing out the liquid fuel by pushing the push button.

According to this fuel cartridge for a fuel cell, by pushing the push button provided on the outer container, the inner container is contracted to push out the liquid fuel and, therefore, the liquid fuel can be supplied without using a pump and it is also possible to display contents by utilizing this push button.

In the thirty-third aspect of the invention, there is provided a fuel cartridge for a fuel cell as defined in any of the twenty-second to thirty-first aspects wherein the cap is a double cap consisting of a screw type inner cap and an outer cap covering the inner cap which is mounted rotatably and slidably in axial direction within a limited distance, said outer cap being rotatable integrally with the inner cap by pushing down and rotating the outer cap and being rotatable in idling by only rotating the outer cap.

According to this fuel cartridge for a fuel cell, the cap is a double cap consisting of a screw type inner cap and an outer cap covering the inner cap which is mounted rotatably and slidably in axial direction within a limited distance, said outer cap being rotatable integrally with the inner cap by pushing down and rotating the outer cap and being rotatable in idling by only rotating the outer cap, the inner cap cannot be rotated by only rotating the outer cap of the double cap unless the rotation is combined with the pushing down operation and, therefore, an erroneous opening of the cap by a child can be prevented and the cartridge can be used further safely.

In the thirty-fourth aspect of the invention, there is provided a fuel cartridge for a fuel cell as defined in any of the twenty-ninth to thirty-first aspects wherein at least one of the key member and the ring member is colored by kneading it into a synthetic resin material containing a coloring agent.

According to this fuel cartridge for a fuel cell, since at least one of the key member and the ring member is colored by kneading it into a synthetic resin material containing a coloring agent, the fuel can be discriminated in a simple manner by changing the color of the coloring agent which is kneaded in the synthetic resin material according to the type of the fuel and, further, since the coloring agent does not come in contact with the fuel, metal ion of the coloring agent does not solve into the fuel and, moreover, the cartridge can be confirmed immediately before it is connected to the fuel cell main body in use and therefore an erroneous mounting can be accurately prevented.

BRIEF DESCRIPTION OF THE DRAWINGS

FIG. 5A1-4 to FIG. 5E1-4 are explanatory views illustrating a state of interference of cases in which coupling can be made by means of the discrimination means, and cases in which coupling cannot be made, and one embodiment of the coupler of the invention in which illustration of the valve and energizing means therefor is omitted.

FIGS. 6A-D are a plan view, a front view, a side view and a sectional view along line A-O-B of a plug only of another embodiment of the coupler of the invention in which illustration of a valve and energizing means therefore is omitted.

FIGS. 10A-B are vertical sectional views of one embodiment of the coupler of the invention in which a socket is separated from a plug and a bottom view of the socket.

FIG. 15A is a vertical sectional view in a separated state and FIG. 15B is a vertical sectional view in a fitted and coupled state of another embodiment of the coupler of the invention in which illustration of a valve and energizing means therefore is omitted.

FIG. 16A is a vertical sectional view in a separated state and FIG. 16B is a vertical sectional view in a fitted and coupled state of another embodiment of the coupler of the invention.

FIG. 18A is a vertical sectional view and FIG. 18B is a partial perspective view of a socket and a plug of one embodiment of the coupler of the invention.

FIG. 20A is a front view and FIG. 20B is a vertical sectional view as a whole of one embodiment of a fuel cartridge for a fuel cell of the invention.

FIG. 21A is a front view and FIG. 20B is a side view of an inner container of the embodiment of the fuel cartridge for a fuel cell of the invention.

FIG. 23A and FIG. 23B are explanatory views illustrating a cam mechanism provided in the embodiment of the fuel cartridge for a fuel cell of the invention and FIGS. 23C, 23D and 23E are general perspective views of a connector on the side of a fuel cell main body.

DESCRIPTION OF PREFERRED EMBODIMENTS

Embodiments of the invention will be described in detail with reference to the accompanying drawings.

Figure 1A:
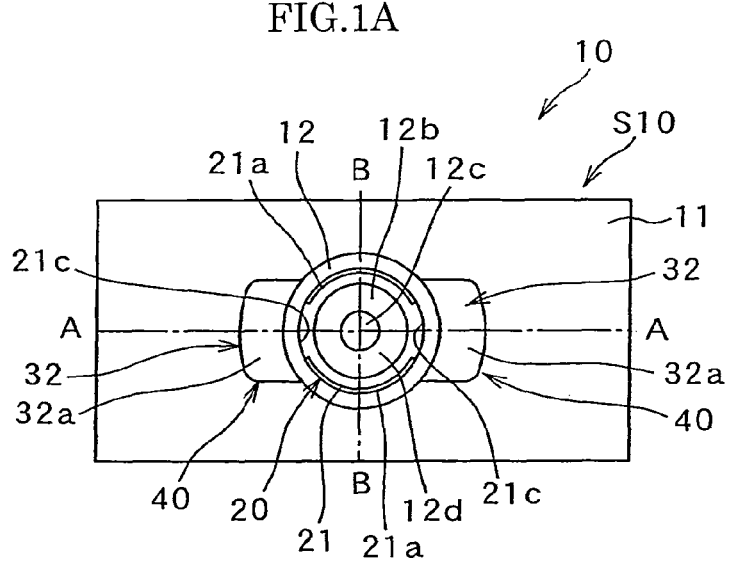
FIGS. 1A-1C are a bottom view, a sectional view along lines A-A and a sectional view along lines B-B of a socket of one embodiment of a coupler of the invention in which illustration of a valve and energizing means therefore is omitted.
Figure 1B:
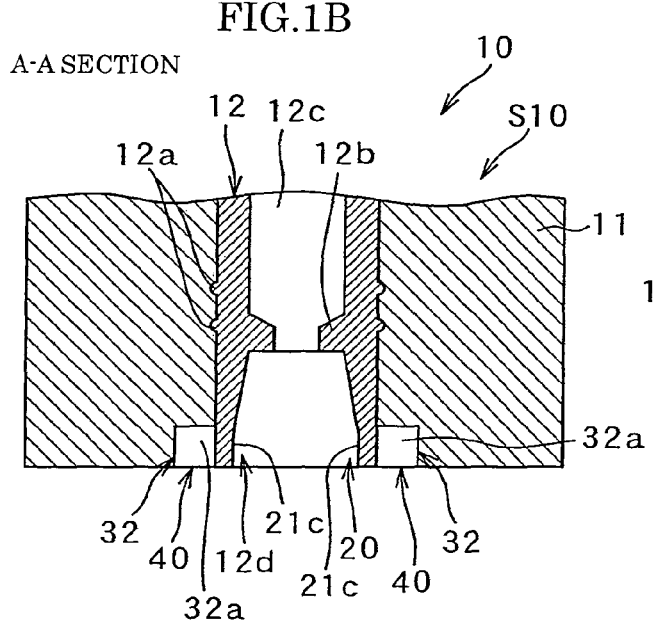
Figure 1C:
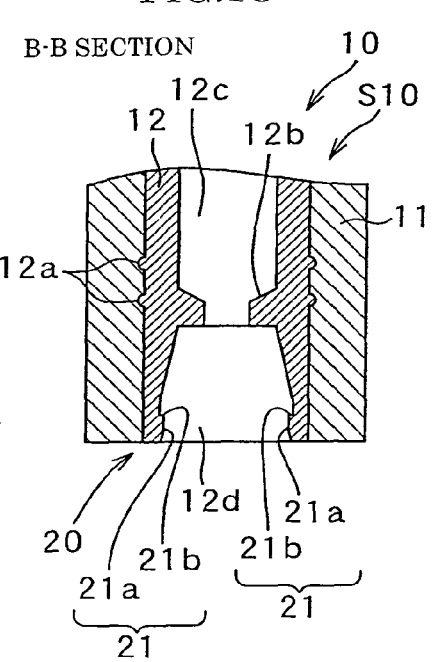
Figure 3:
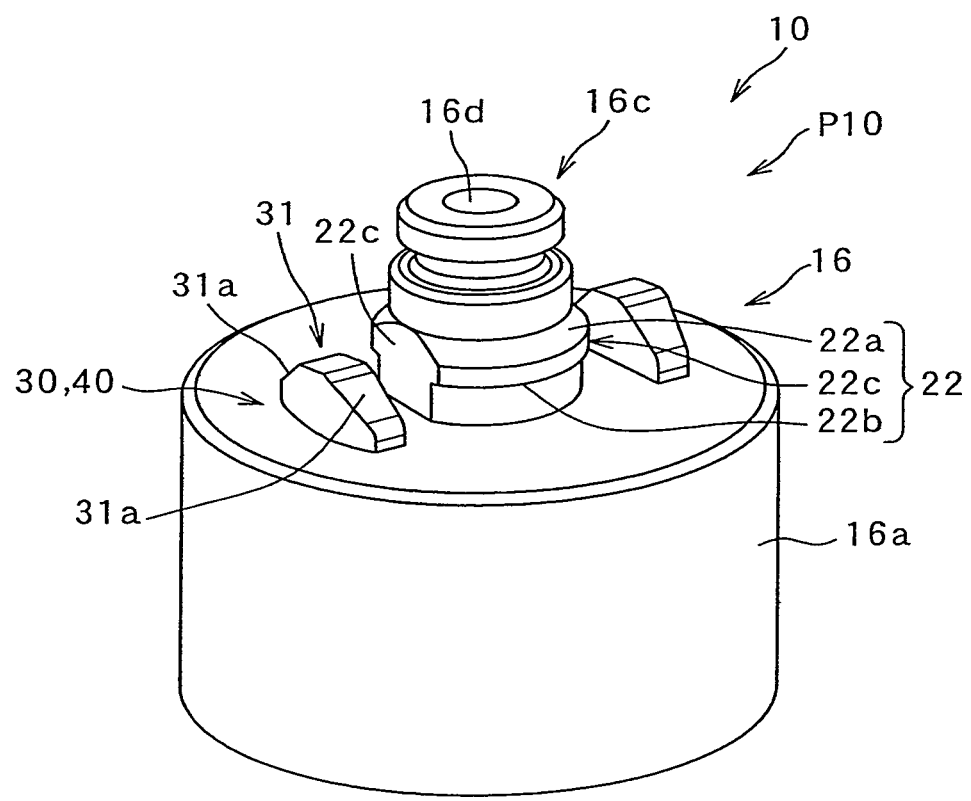
FIG. 3 is a general perspective view of the plug of one embodiment of the coupler of the invention in which illustration of the valve and energizing means therefore is omitted.
Figure 4A:
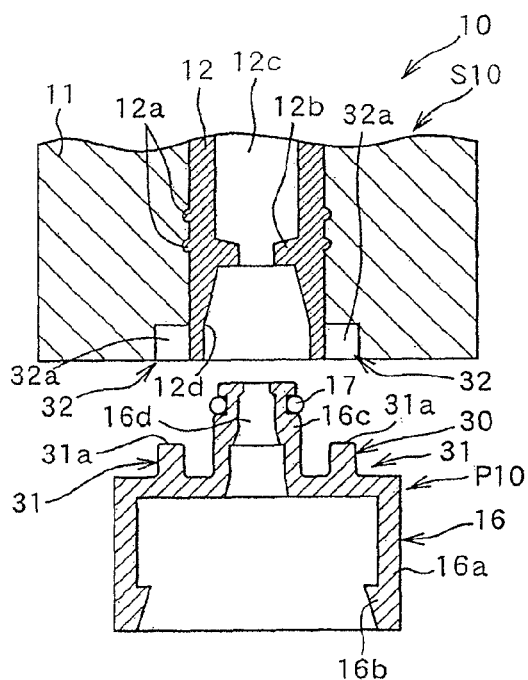
FIG. 4A is a sectional view in the direction of lines A-A and FIG. 4C is a sectional view in the direction of lines B-B of FIG. 1A before coupling, and FIG. 4B a sectional view in the direction of lines A-A of FIG. 1A after coupling
Figure 4B:
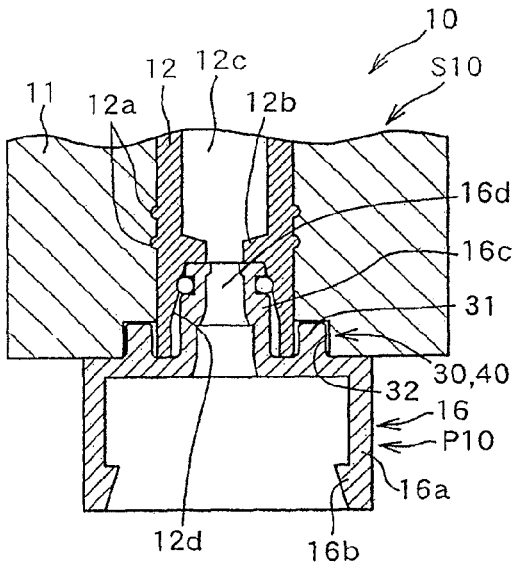
Figure 4C:
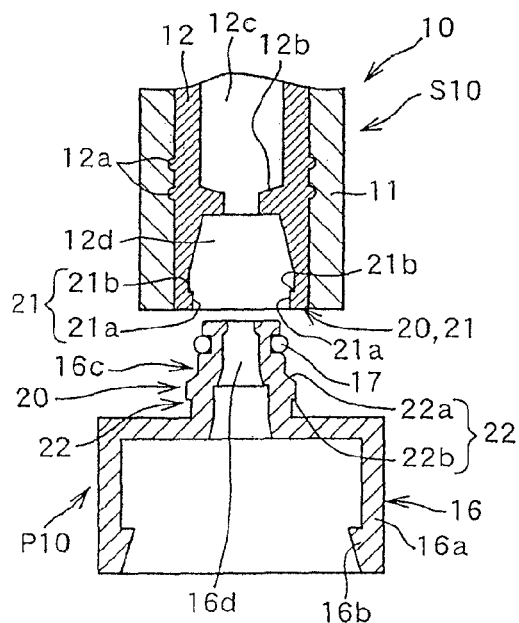
Figure 4D:
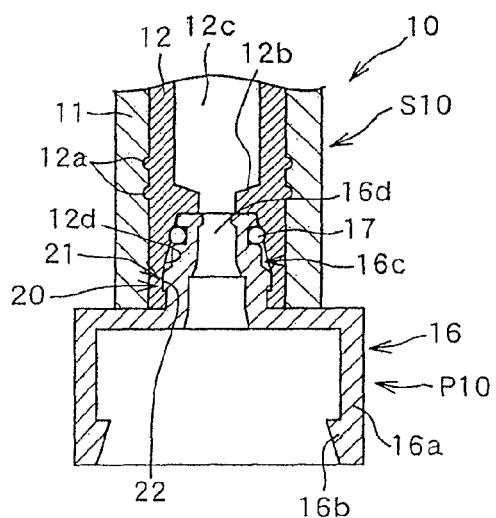
FIG. 4D is a sectional view in the direction of lines B-B of FIG. 1A in a coupling holding state of one embodiment of the coupler of the invention in which illustration of the valve and the energizing means therefore is omitted.

FIGS. 1A-C; 2A-E; 3 and 4A-D show an embodiment of the invention in which illustration of a valve and an energizing means therefor of a coupler is omitted. FIG. 1A is a bottom view, a sectional view along lines A-A and a sectional view along lines B-B of a socket, FIGS. 2A-E are respectively a plan view, a front view, a side view, a sectional view along lines A-A and a sectional view along lines B-B of a plug, FIG. 3 is a general perspective view of the plug, and FIG. 4A is a sectional view in the direction of lines A-A and FIG. 4C is a sectional view in the direction of lines B-B before coupling, and FIG. 4B is a sectional view in the direction of lines A-A and FIG. 4D is a sectional view in the direction of lines B-B in a coupling holding state of the coupler.

This coupler 10 is composed of a socket S10 and a plug P10 which is coupled with the socket S10. The socket S10 is provided on the main body side of, for example, a methanol fuel cell and the plug P10 is provided on the side of a cartridge as a methanol container and they are communicated with each other to be used for supplying fuel to the main body side or for exchanging the cartridge per se. For the main portion of the socket S10 are preferably used a non-metal material, e.g., polypropyrene (PP), polyphenylene sulfide (PPS), high density polyethylene (HDPE) and polystyrene (PS) and also super engineering plastics having methanol-proof property including polyether ether ketone (PEEK) and liquid crystal polymer (LCP) and general use engineering plastics including polyethylene terephthalate (PET) and polybutylene terephthalate (PBT) and polyacetal (POM).

The following description will be made on the basis of the vertical direction in the drawings but this description does not restrict the direction of actual mounting on a container main body but mounting may be made in any direction.

The socket S10 of the coupler 10 comprises a socket main body 12 of a generally cylindrical shape attached to the central portion of a socket member 11 which is mounted to a recessed mounting opening formed in the main body of the fuel cell. The socket main body 12 is positioned in the socket member 11 with two annular projecting portions 12a formed in the outer peripheral surface in the middle portion of the socket main body 12 fitted in corresponding grooves of the socket member 11.

The socket main body 12 is integrally formed in the middle portion thereof with a partitioning portion 12b through which a flow path 12c is formed in the central portion thereof. In the flow path 12c on the side of the base portion (upper end portion in the drawing) of the partitioning portion 12b, there are provided unillustrated valve and an elastic member which energizes it in the closing direction. In the flow path 12c on the side of the forward end portion (lower end side in the drawing) of the partitioning portion 12b, there is provided a plug connecting opening 12d.

This plug connecting opening 12d is formed of a conical portion and a cylindrical portion with the upper end portion having a small diameter and a portion from the middle portion below being formed in a cylindrical shape having a larger diameter.

In this socket S10, the valve is automatically opened and closed by operating an operating unit which is provided integrally with the valve in accordance to coupling with the plug.

For the main portion of the plug P10 which is coupled with the socket S10 are preferably used, in the same manner as in the socket S10, a non-metal material, e.g., polypropyrene (PP), polyphenylene sulfide (PPS), high density polyethylene (HDPE) and polystyrene (PS) and also super engineering plastics having methanol-proof property including polyether ether ketone (PEEK) and liquid crystal polymer (LCP) and general use engineering plastics including polyethylene terephthalate (PET) and polybutylene terephthalate (PBT) and polyacetal (POM).

As shown in FIGS. 2A-E, the plug P10 comprises a plug main body 16 of a generally cylindrical shape which is mounted to an outer periphery of a forward end portion of a nozzle of a container (not shown) in which methanol which is fuel for the fuel cell is contained. The nozzle of the unillustrated container is inserted in a cylindrical portion 16a having a large diameter of the base portion of the plug main body 16 (lower end portion in the drawing) and the nozzle of the container is engaged with an engaging ring portion 16b formed in the inner periphery of the lower end portion of the cylindrical portion 16a and the plug P10 is thereby mounted to the container.

In this plug main body 16 is formed a projecting connecting portion 16c of a generally cylindrical shape mounted in a plug connecting opening 12d of the socket S10 and a flow path 16d is formed through the central portion of the plug main body 16 including the projecting connecting portion 16c.

In this plug main body 16, in the same manner as in the socket S10, unillustrated valve and elastic member for closing the valve in the closing direction are provided.

The projecting connecting portion 16c of the plug P10 mounted to the plug connecting opening 12d of the socket S10 is formed in a two-stage cylindrical shape having an upper portion having a small diameter and a lower portion having a larger diameter corresponding to the inside shape of the plug connecting opening 12d and an O ring 17 for sealing is provided in the stepped portion in the middle portion of the projecting connecting portion 16c.

By this arrangement, when the O ring 17 is inserted in the large diameter portion in the lower portion of the plug connecting opening 12d, sealing by the outer peripheral surface of the O ring 17 is started and, as the O ring 17 comes into abutment with the conical portion of the plug connecting opening 12d, sealing is made also in the forward end portion of the projecting connecting portion 16c.

In the plug P10, by operating the operating unit integral with the valve in accordance with coupling of the socket S10, the valve is opened and closed automatically and by achieving a coupled state, the flow path 16d of the plug P10 is communicated with the flow path 12c of the socket S10 in a sealed state.

The seal between the socket S10 and the plug P10 may alternatively be achieved by providing a seal member made of an elastic member on the side of the socket S10 and making sealing with this seal member and the surface of the forward end portion of the plug P10.

In the coupler 10, a coupling holding means 20 is provided for holding coupling between the socket S10 and the plug P10. The coupling holding means 20 is made, for example, of engaging recesses 21 on one side and engaging projections 22 on the other side which are engaged and disengaged by an overriding action in a straight line direction. They can be engaged by a single action of pushing in and can be disengaged by a single action of pulling out.

In the socket S10 of this coupler 10, in the inner peripheral lower end portion of the plug connecting opening 12d of the socket member 11 attached to the mounting opening of the main body of the fuel cell, there are provided the engaging recesses 21 which constitute one side of the coupling holding means 20 each having an inclined surface 21a narrowing from the lower edge upwardly and a horizontal engaging surface 21b at the upper end of the inclining surface 2. As shown in FIGS. 1A-B, recessed portions 21c are formed on the left and right sides of the circumference (left and right opposite positions across the central axis of the socket S10) so that they can be engaged with the engaging projections 22 of the plug P10 to be described later which are counterparts thereof after the engaging projections 22 are inserted in an overriding manner.

In the plug P10 of the coupler 10, in the outer periphery of the base portion of the projecting connecting portion 16a of the plug P10, the engaging projections 22 which constitute the counterpart of the coupling holding means 20 for holding coupling with the socket S10 are formed, as shown in FIGS. 2A-E and 3, in such a manner that they project outwardly in correspondence to the engaging recesses 21 in the plug connecting opening 12d of the socket S10. The engaging projections 22 have an inclining surface 22a narrowing from the lower end upwardly and a horizontal engaging surface 22b at the lower end of the inclining surface 22a.

Figure 2A:
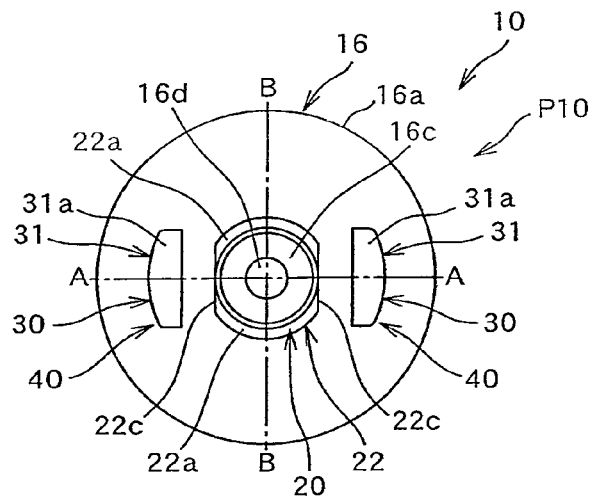
FIGS. 2A-2E are a plan view, a front view, a side view, a sectional view along lines A-A and a sectional view along lines B-B of a plug of one embodiment of the coupler of the invention in which illustration of the valve and energizing means therefore is omitted.
Figure 2B:
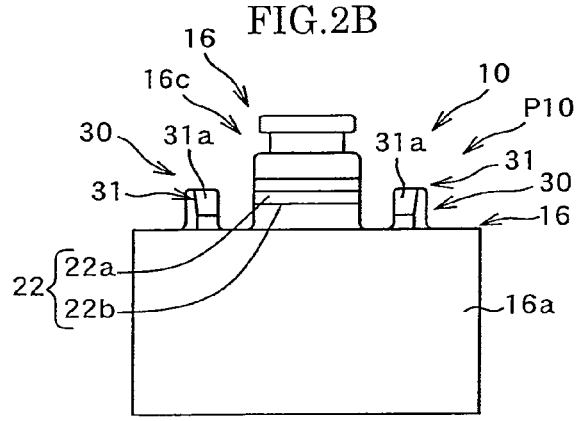
Figure 2C:
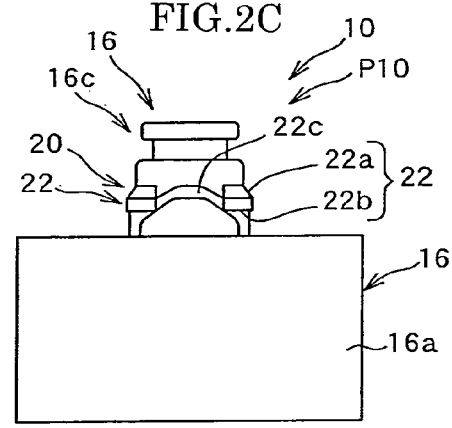
Figure 2D:
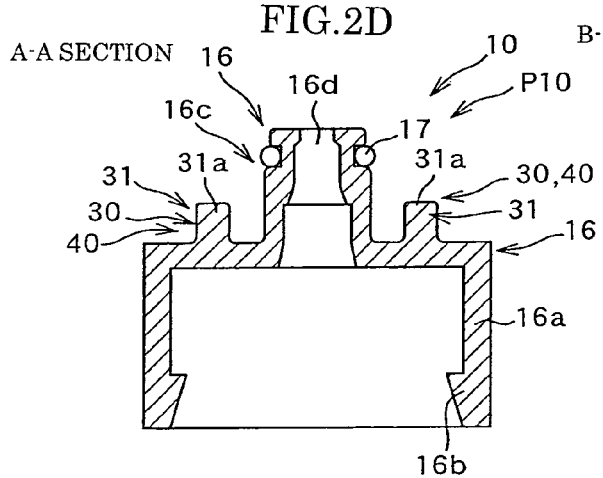
Figure 2E:
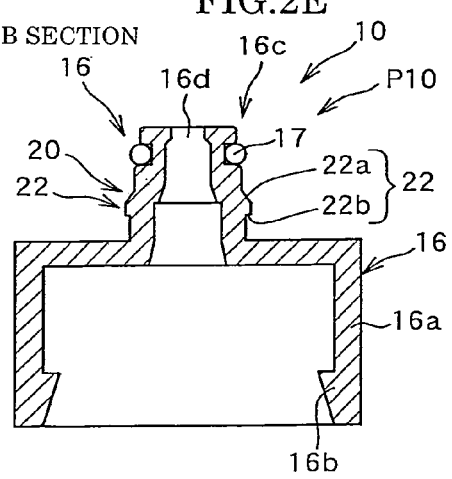

The engaging projections 22 have, as shown in FIGS. 2A, B, C and E and 3, recessed portions 22c on the left and right sides of the circumference (opposite positions across the central axis of the plug P10).

By this arrangement, when the plug P10 having the engaging projections 22 is inserted into the engaging recesses 21 of the socket S10 which constitute the counterpart, the engaging projections 22 are pushed into the engaging recesses 21 in such a manner that the inclining surfaces 22a and the inclining surfaces 21a override each other and, upon completion of insertion, the engaging surfaces 22b at the lower end of the engaging projections 22 are engaged with the engaging surfaces 21b at the upper end of the engaging recesses 21 whereby a coupling state is maintained.

For releasing coupling, the plug P10 having the engaging projections 22 is pulled out of the engaging recesses 21 of the socket S10. The engaging surfaces 22b at the lower end of the engaging projections 22 are disengaged from the engaging surfaces 21b at the upper end of the engaging recesses 21 in such a manner that they override each other with the inclining surfaces 22a being pulled away from the inclining surfaces 21a while keeping contact with each other and the coupling state is therefore released and the socket S10 is separated from the plug P10.

Accordingly, in this coupling holding means 20, holding force can be secured by overriding the engaging recesses 21 and the engaging projections 22 with each other and then causing the engaging surfaces 21b and 22b to engage with each other and, by changing the magnitude of the recessed portions 21c and 22c, holding force for holding coupling can be changed and, simultaneously, releasing force for releasing coupling can also be adjusted.

In this coupling holding means 20, by providing the engaging recesses 21 in the plug connecting opening 21 of the socket S10 and providing the engaging projections 22 in the projecting connecting portion 16c of the plug P10, installation space can be held at the minimum and it can be provided easily even in a device having a small thickness.

In this coupler 10, when an excessive force exceeding a normal range of use is applied in the direction of rotation about the central axis of the socket S10 and the plug P10, i.e., a forcible rotational force is applied, there is likelihood that damage is caused to the coupler 10 or the devices on the main body side. A releasing means 30 therefore is provided for preventing such damage.

This releasing means 30 is made of a cam portion 31 provided in one of the socket S10 and the plug P10 and a cam follower portion 32 provided in the other of the socket S10 and the plug P10 and functions to automatically release coupling by converting an excessive rotational force to a pulling away force in the direction of insertion and pulling out.

The cam portion 31 which constitute one part of the releasing means 30 comprises cam surfaces 31a which are formed at diagonal positions in the circumference which is concentrical with the projecting connecting portion 16c of the plug P10 in such a manner that they have inclining surfaces in both sides in the circumferential direction which are formed along the circumference and project upwardly in the arcuate shape. In correspondence to the cam portion 31 made of the upwardly projecting cam surfaces 31a, the cam follower portion is formed as cam follower grooves 32 corresponding to the shape of the cam in the diagonal positions of the socket main body 12 in the socket member 11 of the socket S10 on the both sides of the plug connecting opening 12d. The cam surfaces 31a are prevented from contacting the cam follower grooves 32a until at least the coupling state is brought about.

The cam surfaces 31a and the cam follower grooves 32a are formed with about the same vertical width as the diameter of the plug P10 so that they can be provided in the installation space of the coupler 10.

Accordingly, when a relative rotational force about the central axis of the plug P10 and the socket S10 is applied between the plug P10 and the socket S10, by relative rotation between the cam surfaces 31a of the cam portion 31 formed substantially in the circumferential direction and the cam follower grooves 32a of the cam follower portion 32 in contact with each other, force in axial direction is applied between the plug P10 and the socket S10 to separate them from each other and thereby automatically release coupling. Thus, by this releasing means 30, when an excessive rotational force exceeding a normal range of use is applied, coupling can be automatically released.

By this arrangement, even if an excessive force exceeding a normal range of use is applied, the plug P10 can be removed safely and automatically from the socket S10 without damaging the coupler 10 or devices of the main body.

Moreover, in case of detaching the plug P10 from the socket S10, by applying a rotational force by utilizing this releasing means 30, force for separating them can be generated easily to detach the plug P10 from the socket S10.

In the coupler 10 made in this manner, when the socket S10 should be coupled to the plug P10 as shown in FIGS. 4A-D, the projecting connecting portion 16c of the plug P10 is inserted into the plug connecting opening 12d of the socket S10 and the engaging projections 22 are positioned opposite to the engaging recesses 21 of the coupling holding means 20 of the socket member 11 and the engaging projections 22 are pushed straightly into the engaging recesses 21.

By this operation, the O ring 17 of the projecting connecting portion 16c of the plug P10 is inserted into the lower large diameter portion of the plug connecting opening 12d of the socket S10 and seal by the outer peripheral surface of the O ring 17 thereby is started and the valves of the socket S10 and the plug P10 are automatically opened accompanying the coupling operation by operation of the unillustrated operating unit provided in the valves and the flow path 16d of the plug P10 is communicated with the flow path 12c of the socket S10 in a sealed state. As the O ring 17 comes into abutment with the conical portion of the plug connecting opening 12d, seal is achieved in the forward end portion also to thereby complete the seal.

In the coupling holding means 29, as the coupling operation proceeds, the inclining surfaces 21a at the lower end of the engaging recesses 21 and the inclining surfaces 22a of the engaging projections 22 come into contact with each other and are elastically deformed by pushing each other. As the plug P10 is further pushed into the socket S10, the engaging recesses 21 and the engaging projections 22 override each other whereby engagement in which the engaging surfaces 21a contact the engaging surfaces 22b is achieved and coupling thereby is maintained.

When the coupling state should be released, by pulling out the plug P10 out of the socket S10, the engaging surfaces 21b of the engaging recesses 21 and the engaging surfaces 23a of the engaging projections 22 are elastically deformed in a manner to be expanded outwardly and engagement between them thereby is released and, by further pulling out the plug P10, the inclining surfaces 21a of the engaging recesses 21 are disengaged from the inclining surfaces 22a of the engaging projections 22 while they are in contact with each other and coupling thereby is released.

According to the coupler 10, connecting and disconnecting of the socket S10 and the plug P10 can be performed by merely pushing in and pulling out of the plug P10, i.e., simply by a single action. Therefore, installation space can be saved. For example, as compared with a twist lock mechanism in which coupling is accomplished by combination of an insertion and pulling out operation and a rotating operation, it is not necessary to secure space for rotation and therefore space can be saved.

In the coupling holding means 20 of this coupler 10, since coupling is achieved by engagement between the engaging surfaces 21b having the recessed portions 21c and the engaging surfaces 22b having the recessed portions 22c, engaging force can be reduced by the recessed portions 21c and 22c and, when an excessive force is applied in axial direction to the plug P10 and the plug P10 is overloaded, the coupling is released without breaking or damaging of a component part of the coupler 10 whereby the plug P10 can be disengaged safely from the socket S10.

When an excessive force exceeding a normal range of use is applied in the direction of rotation about the central axis between the plug P10 and the socket S10, the cam surfaces 31a of the cam portion 31 extending substantially in the circumferential direction rotate in the cam follower grooves 32a of the cam follower portion 32 while they are in contact with each other and an axial force thereby acts between the plug P10 and the socket S10 to pull them apart and therefore coupling can be automatically released without damage to the coupler 10 and the devices of the main body and the plug P10 can be disengaged from the socket S10 safely and automatically. In case of this automatic release, since the recessed portions 21c are provided in the engaging recesses 21 and the recessed portions 22c are provided in the engaging surfaces projections 22, the engaging recesses 21 are positioned at the recessed portions 22c and the engaging projections 22 are positioned at the recessed portions 21c whereby coupling can be released by a further smaller force.

In this coupler 10, coupling and release of coupling are brought about by overriding action between the engaging recesses 21 and the engaging projections 22, particularly in coupling, engagement is achieved after the overriding operation, feeling of clicking is created and achievement of engagement can thereby be accurately known.

In this coupler 10, as a type of discrimination means 40 for preventing connection of the plug P10 of a container containing methanol having a different concentration from that of methanol to be used in a methanol fuel cell, a discrimination function is provided by changing vertical and lateral lengths, i.e., length (width) in substantially the circumferential direction and length (thickness) in substantially the radial direction, of the two cam portions 31 and the two cam follower portions 32 on a plane crossing the coupling direction of the two cam portions 31 in diagonal positions of the releasing means 30 and the two cam follower portions 32 which are formed as grooves in which the cam portions are engaged.

In this discrimination means 40, for enabling only a set of the plug P10 and the socket S10 to be coupled by changing width B and thickness D of the two cam surfaces 31a and the cam follower grooves 32a in which the cam surfaces 31a are fitted, in a case where, for example, four kinds of combinations are discriminated, combinations are made, as shown in FIGS. 5A1-4 to 5E1-4, by 1) width B1 and thickness D1, 2) width B2 and thickness D2, 3) width B3 and thickness D3 and 4) width B and thickness D4, where B1>B2>B3>B4 and D1<D2<D3<D4.

Since when an excessive force exceeding a normal range of use (excessive rotational force) is applied, coupling is released by utilizing the cam portion 31 and the cam follower portion 32 of the releasing means 30, necessary clearance in the direction of rotation is provided between the cam portion 31 and the cam follower portion 32 and the discrimination can be made by setting difference in the width B and the thickness D exceeding this clearance. Clearance is set, for example, at about 0.1 mm and the difference in the width and thickness is set at about 0.3 mm-0.5 mm.

Discrimination between respective sets is made by combining increasing of the width B with decreasing of the thickness D for preventing an erroneous coupling which may occur due to inability to discriminate the cam surface 31a of a set of a small width and a small thickness in a large cam follower groove 32a in case a large width and a large thickness are combined. FIGS. 5 B-E show states of interference in a case where connection can be made (1)-4)) and cases where connection cannot be made (each three states other than (1)-4)).

By this arrangement, in this coupler 10, when the cam surfaces 31a are fitted in the cam follower grooves 32a for coupling the plug P10 with the socket S10 by inserting the plug P10 into the socket S10, since there is the discrimination function imparted between them, a predetermined one set only can be fitted and, therefore, one socket S10 and one plug P10 only can be discriminated from other sockets and plugs and connected to each other.

Accordingly, in the above described cases, discrimination of four types of 1) to 4) can be made. By increasing difference between the largest values and the smallest values of the width B and the thickness D and thereby increasing the number of combination of difference in the size, types which can be discriminated can be increased.

As patterns which can be discriminated increases, it will become difficult to distinguish difference in the size of the cam surfaces 31a and the cam follower grooves 32a by appearance. Discrimination can be facilitated by distinguishing the socket S10 and the plug P10 of the coupler 10 which can be coupled together by, for example, combining discrimination by the same color or by the same colored design.

By disposing the two cam portions and cam follower portions respectively at diagonal positions, good balance of force applied for maintaining coupling and automatic release of coupling by the cam can be obtained and thickness of the coupler per se can thereby be decreased and installation space can thereby be held at the minimum. It is also possible to increase the number of patterns of discrimination by not adopting the diagonal positions but adopting varying the angle between the two cam portions and cam follower portions.

The cam portions and the cam follower grooves of the releasing means and the discrimination means may be provided by exchanging the plug and the socket.

Another embodiment of the coupler of the invention will be described with reference to FIG. 6. The same components as those which have already been described in the above described embodiment will be designated by the same reference characters and description will be omitted.

FIGS. 6A-D comprise a plan view, front view, side view and sectional view along lines A-O-B of the plug only.

In this coupler 10A, releasing means 30A is made in a more compact design. In this releasing means 30A, cam portions 31A are provided in one of the socket S10 and the plug P10 and cam follower portions 32A are provided in the other of the socket S10 and the plug P10 and coupling can be automatically released by converting an excessive rotational force to pulling away force in the direction of insertion and disengagement.

The cam portions 31A of the releasing means 30A comprise cam surfaces 31Aa having upwardly projecting inclining surfaces at diagonal positions in the outer periphery of the base portion of a projecting connecting portion 16c of the plug P10. In correspondence to the cam portions 31A made of the upwardly projecting cam surfaces 31Aa, cam follower portions in the form of grooves corresponding to the shape of the cam are formed as cam follower grooves at both sides of the plug connecting opening at diagonal positions integrally with the socket main body 12 of the socket member 11 in the unillustrated socket S10.

The cam surfaces 31Aa and the unillustrated cam follower grooves are prevented from contacting each other until at least coupling of the plug P10 and the socket S10.

The cam surfaces 31Aa and the cam follower grooves are formed in a vertical width which is generally smaller than the diameter of the projecting connecting portion 16c of the plug P10 thereby to realize a compact design in consideration also of length of projection on both sides in the circumferential direction from the projecting connecting portion 16c.

By this arrangement, the coupler 10A can be installed in a smaller space than the coupler 10.

Accordingly, in this coupler 10A also, when a rotational force about the central axis is applied relatively between the plug P10 and the socket S10, the cam surfaces 31Aa of the cam portions 31A extending substantially in the circumferential direction and the cam follower grooves are rotated relative to each other while they are contacting each other and, therefore, force in the direction of the central axis acts between the plug P10 and the socket S10 to pull them apart and coupling is automatically released whereby when an excessive rotational force exceeding a normal range of use is applied, coupling can be released automatically by the releasing means 30A.

Thus, even when an excessive force exceeding a normal range of use is applied, the plug P10 can be disengaged from the socket S10 without damaging the coupler 10A or the devices of the main body.

In case the plug P10 should be removed from the socket S10, by applying a rotational force by utilizing the releasing means 30A, pulling away force can be created and the plug P10 can be removed from the socket S10 easily.

In this coupler 10A, the engaging projections 22 of the coupling holding means 20 in the plug P10 are formed at diagonal positions (upper and lower positions in FIG. 6(*a*)) crossing the cam portions 31A of the releasing means 30A with a smaller width than the width of the projecting connecting portion 16c while the recessed portions 22c are formed in broader ranges. In correspondence to this, width of the unillustrated engaging projections of the socket S10 is made small and the recessed portions are formed in broader ranges.

By this arrangement, force required for releasing can be minimized and the plug P10 and the socket S10 can be disengaged from each other by pulling them apart by the releasing means 30A more safely against an excessive rotational force.

In this coupler 10A also, in the same manner as in the above described coupler 10, as a type of discrimination means 40 for preventing connection with the socket S10 of the plug P10 of a container containing methanol having a different concentration from that of methanol to be used in a methanol fuel cell, a discrimination function is provided by changing vertical and lateral lengths, i.e., length (width) B in substantially the circumferential direction and length (thickness) D in substantially the radial direction, of the two cam portions 31A and the two cam follower portions on a plane (as shown in FIGS. 6A, B and D and FIG. 7A) crossing the coupling direction of the two cam follower portions in diagonal positions of the releasing means 30A and the two cam follower portions of the unillustrated socket S10 which are formed as grooves in which the cam portions are engaged.

Figure 7A:
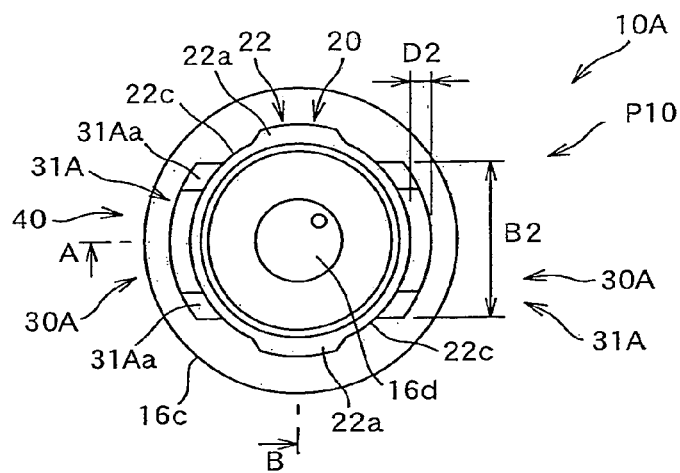
FIGS. 7A-C are a plan view, a front view and a side view of a plug only of another embodiment of the coupler of the invention in which illustration of a valve and energizing means therefore is omitted.
Figure 7B:
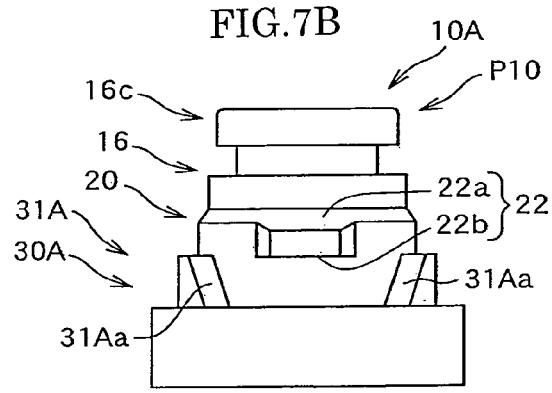
Figure 7C:
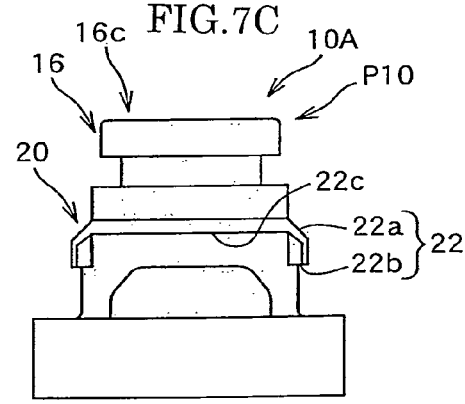

In this discrimination means 40, for enabling only a set of the plug P10 and the socket S10 to be coupled, in a case where, for example, two kinds of combinations are discriminated, as shown in FIGS. 6A-D and 7A-C, combinations are made by width B1 and thickness D1 in FIG. 6A and width B2 and thickness D2 in FIG. 7A where B1<B2 and D1>D2.

Since when an excessive force exceeding a normal range of use (forcibly rotating force) is applied, coupling is released by utilizing the cam portion 31A and the cam follower portion of the releasing means 30A, necessary clearance in the direction of rotation is provided between the cam portion 31A and the cam follower portion and the discrimination can be made by setting difference in the width B and the thickness D exceeding this clearance. Clearance is set, for example, at about 0.1 mm and the difference in the width and thickness is set at about 0.3 mm-0.5 mm.

Discrimination between respective sets is made by combining decreasing of the width B with increasing of the thickness D for preventing an erroneous coupling which may occur due to inability to discriminate the cam surface 31Aa of a set of a small width and a small thickness in a large cam follower groove in case a large width and a large thickness are combined.

By this arrangement, in this coupler 10A, when the cam surfaces 31Aa are fitted in the cam follower grooves for coupling the plug P10 with the socket S10 by inserting the plug P10 into the socket S10, since there is the discrimination function imparted between them, a predetermined one set only can be fitted and, therefore, one socket S10 and one plug P10 only can be discriminated from other sockets and plugs and connected to each other.

Accordingly, in the above described cases, discrimination of two types can be made. By increasing difference between the largest values and the smallest values of the width B and the thickness D and thereby increasing the number of combination of difference in the size, types which can be discriminated can be increased.

As patterns which can be discriminated increases, it will become difficult to distinguish difference in the size of the cam surfaces 31Aa and the cam follower grooves by appearance. Discrimination can be facilitated by distinguishing the socket S10 and the plug P10 of the coupler 10 which can be coupled together by, for example, combining discrimination by the same color or by the same colored design.

Other structure of the coupler 10A is the same as the structure of the coupler 10 already described and the same function and effects are thereby obtained.

Another embodiment of the coupler of the invention will be described with reference to FIGS. 8A-C. The same components as those which have been described with respect to the above described two embodiments are designated by the same reference characters and description thereof will be omitted.

FIG. 8 is a plan view, a front view and a side view showing only the plug of the coupler.

In this plug 10B, cam portions 31B which are provided in one of the socket S10 and the plug P10 are provided at four positions at an equal interval in the circumferential direction which are two pairs of diagonal positions in the outer periphery of the base portion of the projecting connecting portion 16c of the plug P10 and corresponding unillustrated cam follower portions are provided at four positions at an equal interval in the circumferential direction which are two pairs of diagonal positions of the other of the socket S10 and the plug P10 whereby coupling can be automatically released by converting an excessive rotational force to a pulling away force in the direction of insertion and engagement.

The cam portions 31B of the releasing means 30B are made of can surfaces 31Ba having upwardly projecting inclining surfaces on both sides so that the releasing means 30B can function against rotation in both clockwise and counterclockwise directions. In correspondence to the cam portions 31B made of the upwardly projecting cam surfaces 31Ba, cam follower portions in the form of grooves corresponding to the shape of the cam are formed as cam follower grooves at four positions at an equal distance in the circumferential direction which are two pairs of diagonal positions at both positions of the plug connecting opening integrally with the socket main body 12 of the socket member 11 in the unillustrated socket S10.

The cam surfaces 31Ba and the unillustrated cam follower grooves are prevented from contacting each other until at least coupling of the plug P10 and the socket S10.

The cam surfaces 31Ba and the cam follower grooves are formed in a vertical width which is generally smaller than the diameter of the projecting connecting portion 16c of the plug P10 thereby to realize a compact design in consideration also of length of projection on both sides in the circumferential direction from the projecting connecting portion 16c.

By this arrangement, the coupler 10B can be installed in a smaller space than the coupler 10.

Accordingly, in this coupler 10B also, when a rotational force about the central axis is applied relatively between the plug P10 and the socket S10, the cam surfaces 31Ba of the cam portions 31B extending substantially in the circumferential direction and the cam follower grooves of the cam follower portions are rotated relative to each other while they are contacting each other and, therefore, force in the direction of the central axis acts between the plug P10 and the socket S10 to pull them apart and coupling is automatically released whereby when an excessive rotational force exceeding a normal range of use is applied, coupling can be released automatically by the releasing means 30B.

Thus, even when an excessive force exceeding a normal range of use is applied, the plug P10 can be disengaged from the socket S10 without damaging the coupler 10B or the devices of the main body.

In case the plug P10 should be removed from the socket S10, by applying a rotational force by utilizing the releasing means 30B, pulling away force can be created and the plug P10 can be removed from the socket S10 easily.

Figure 8A:
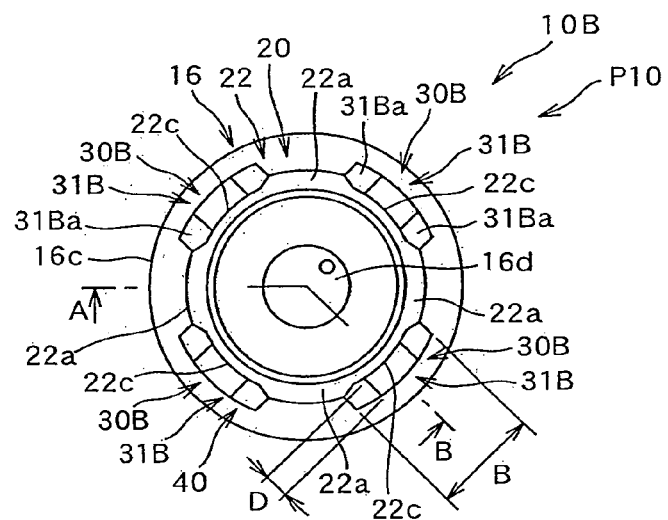
FIGS. 8A-C are a plan view, a front view and a side view of a plug only of another embodiment of the coupler of the invention in which illustration of a valve and energizing means therefore is omitted.
Figure 8B:
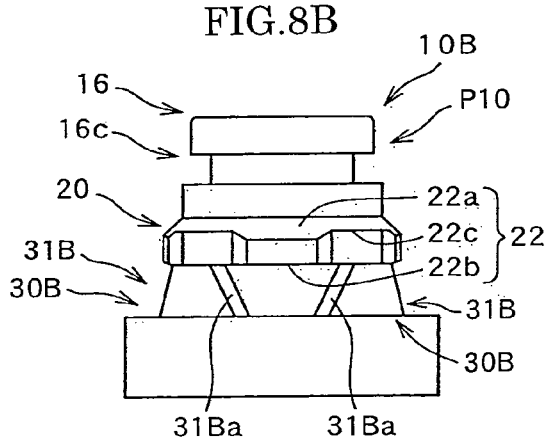
Figure 8C:
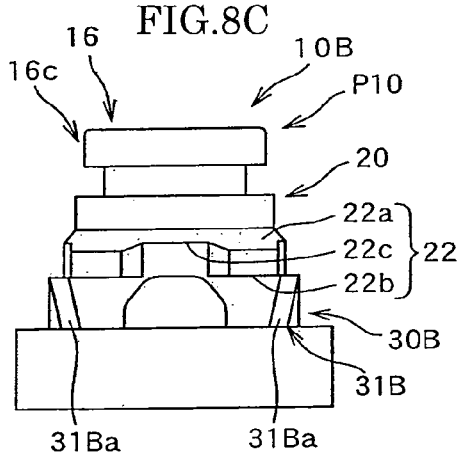
Figure 9:
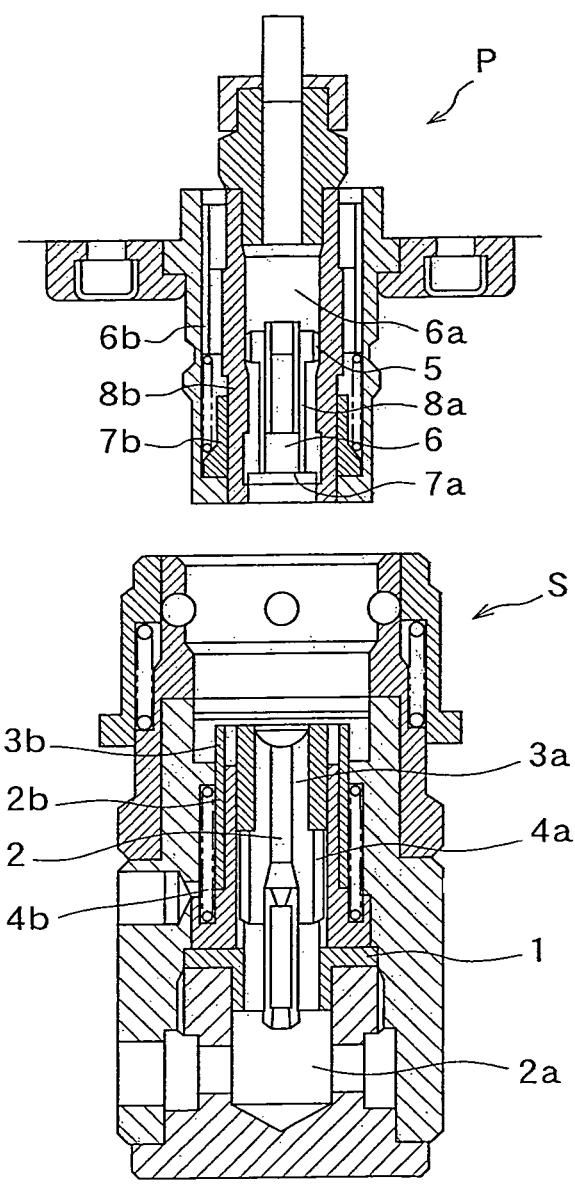
FIG. 9 is a vertical sectional view of a prior art coupler.

In this coupler 10B, the engaging projections 22 of the coupling holding means 20 in the plug P10 are formed at four positions (upper, lower, left and right positions in FIG. 8A at an equal interval in the circumferential direction (upper and lower positions in FIG. 6A) between the cam portions 31B at two pairs of diagonal positions and the recessed portions 22c are formed substantially in the same range as the cam portions 30b. In correspondence to this, although illustration is omitted, engaging recesses provided in the socket S10 are formed between the cam follower portions and recessed portions are formed in the same range as the cam follower portions.

By this arrangement, force required for releasing can be reduced even though angle of rotation in the direction of rotation is small and the plug P10 and the socket S10 can be disengaged from each other by pulling them apart by the releasing means 30B more safely against an excessive rotational force than in a case where the engaging projections etc. are disposed at one pair of diagonal positions.

In this coupler 10B also, in the same manner as in the above described coupler 10A, in a case where discrimination means is provided for preventing connection with the socket S10 of the plug P10 of a container containing methanol having a different concentration from that of methanol to be used in a methanol fuel cell, a discrimination function is provided by changing vertical and lateral lengths, i.e., length (width) B in substantially the circumferential direction and length (thickness) D in substantially the radial direction, of the four cam portions 31B and the four cam follower portions on a plane (FIG. 8) crossing the coupling direction of the four cam follower portions in diagonal positions of the releasing means 30B and the four cam follower portions of the unillustrated socket S10 which are formed as grooves in which the cam portions are engaged.

In this discrimination means also, since when an excessive force exceeding a normal range of use (forcibly rotating force) is applied, coupling is released by utilizing the cam portion 31B and the cam follower portion of the releasing means 30B, necessary clearance in the direction of rotation is provided between the cam portion 31B and the cam follower portion and the discrimination can be made by setting difference in the width B and the thickness D exceeding this clearance. Clearance is set, for example, at about 0.1 mm and the difference in the width and thickness is set at about 0.3 mm-0.5 mm.

Discrimination between respective sets is made by combining decreasing of the width B with increasing of the thickness D for preventing an erroneous coupling which may occur due to inability to discriminate the cam surface 31Ba of a set of a small width and a small thickness in a large cam follower groove in case a large width and a large thickness are combined.

By enabling coupling at any position with an interval of 90 degrees in determining a discrimination pattern, the number of discrimination patterns decreases but operability can be improved.

Discrimination can also be made by a pair of the cam portion and cam follower as already described and two pairs of the cam portions and cam followers. In this case, the discrimination pattern should be determined so that a combination of a small width and a small thickness will not be coupled with a combination of a large width and a large thickness.

By this arrangement, in this coupler 10B, when the cam surfaces 31Ba are fitted in the cam follower grooves for coupling the plug P10 with the socket S10 by inserting the plug P10 into the socket S10, since there is the discrimination function imparted between them, a predetermined one set, only can be fitted and, therefore, one socket S10 and one plug P10 only can be discriminated from other sockets and plugs and connected to each other.

As patterns which can be discriminated increases, it will become difficult to distinguish difference in the size of the cam surfaces 31Ba and the cam follower grooves by appearance. Discrimination can be facilitated by distinguishing the socket S10 and the plug P10 of the coupler 10B which can be coupled together by, for example, combining discrimination by the same color or by the same colored design.

Other structure of the coupler 10B is the same as the structures of the coupler 10 and coupler 10A already described and the same function and effects are thereby obtained.

In the above described two embodiments, the cam portions 31A and 31B of the couplers 10A and 10B are provided integrally with the base portions of the projecting connecting portions and the unillustrated cam follower portions are provided integrally with the plug connecting openings of the socket S10. Alternatively, positions of provision of the cam portions and the cam followers may be reverse.

In the above described coupler, an excessive force exceeding a normal range of use (forcibly rotating force) is applied, the coupling of the socket with the plug is released by utilizing the releasing means by means of the cam portion and the cam follower portion. There is a case, however, where force is applied not only to rotate the coupler but also to bend the socket relative to the plug. By providing an interference prevention space (a narrow part) by which the socket and the plug will not interfere with each other even if one of them is bent, coupling can be released without interference between the socket and the plug before damage occurs to them.

In the above described two embodiments, description has been omitted with respect to a valve and an elastic member to energize the valve. By positioning the valve provided in the plug in the inside from the foremost end surface of the projecting connecting portion, a direct opening of the valve by erroneous touching or the like can be prevented.

In the above described embodiments, the discriminating function is imparted by changing lateral and vertical lengths of the cam portion and the cam follower portion as the discrimination means or by changing the number of installation. Discriminating function may also be imparted by combining it with changing the diameter of the forward end portion of the projecting connecting portion of the plug and the diameter of the plug connecting opening in which the projecting connecting portions is fitted. In this case, combination should be made in such a manner that the plug having the forward end portion of the projecting connecting portion of a large diameter crosses the cam portion which has a small width or thickness so that a pair having a small size will not be coupled with a pair having a large size.

Description has been made about the use of these couplers as to a case of coupling of a container of methanol with a main body of a methanol fuel cell by way of example. The use of the couplers is not limited to this but they may be used for other purposes. The couplers are particularly useful when there is need to discriminate various types of contents.

Figure 11:
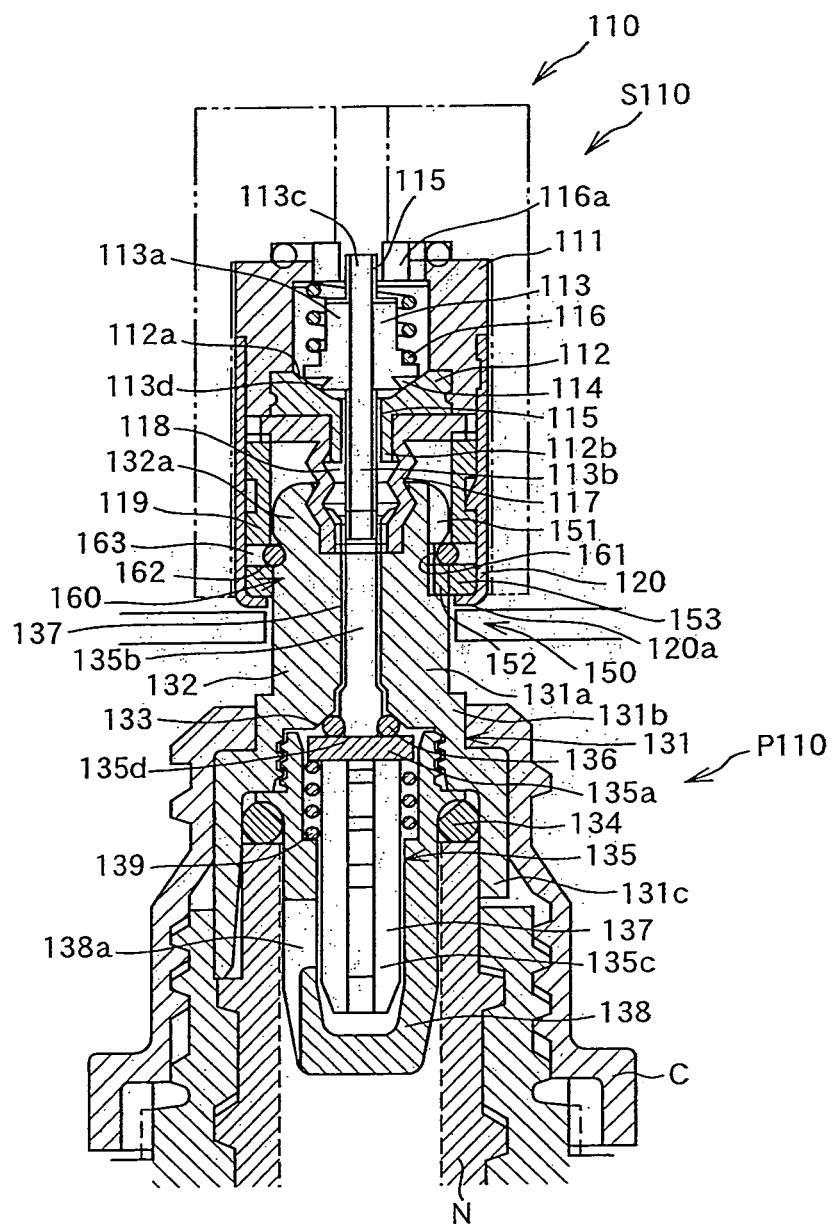
FIG. 11 is a vertical sectional view of the embodiment of the coupler of the invention in which the socket and the plug are fitted and coupled with each other.

FIGS. 10A-B and 11 show another embodiment of the coupler of the invention. FIG. 10A is a vertical sectional view of a state in which the socket is separated from the plug and a bottom view of the socket. FIG. 11 is a vertical sectional view showing a state in which the socket is coupled with the plug.

This coupler 110 comprises a socket S110 and a plug P110 which is coupled with the socket S110. The socket S110 is provided on the side, for example, of a main body of a methanol fuel cell and the plug P110 is provided on the side of a cartridge as a methanol container and, by communicating them with each other, fuel is supplied to the main body or the cartridge per se is exchanged. The main part of the socket S110 except for a part of component such as a spring is preferably made of a non-metal material such as polypropylene (PP) and polyphenylene sulfide (PS), high density polyethylene (HDPE) and polystyrene (PS), super engineering plastics such as polyether ether ketone (PEEK) having a methanol-proof property and liquid crystal polymer (LCP) and general engineering plastics such as polyethylene terephthalate (PET), polybutylene terephthalate (PBT) and polyacetal (POM).

The following description will be made on the basis of the vertical direction in the drawings but this description does not restrict the direction of actual mounting on a container main body but mounting may be made in any direction.

In the socket S110 of the coupler 110, a socket member 111 which is of a generally cylindrical shape and has an inner space which constitutes a valve chamber is mounted in and fixed to a recessed mounting opening formed in a main body of a fuel cell.

A valve seat member 112 is attached to a lower end opening of the socket member 111 which has a valve seat 112a formed in a conical shape on the upper surface side and a cylindrical valve guide portion 112b which is integrally formed with the valve seat member 112 and projects downwardly in the central portion of the valve seat member 112.

A valve main body 113 is mounted in the valve chamber of the socket member 111 above the valve seat member 112. The valve main body 113 is composed integrally of a valve head 113a of a substantially columnar shape of a large diameter in the central portion, a valve stem 113b of a columnar shape of a small diameter projecting from the lower end of the central portion and a guide portion 113b projecting from the upper end of the central portion. The valve stem 113b is mounted in the valve guide portion 112b to reciprocate therein. An O ring groove 113d is formed in the lower end portion of the valve head 113a of the valve main body 113 and an O ring 114 is mounted in the O ring groove 113d. On the side surfaces of the valve stem 113b and the guide portion 113c in the lower and upper ends of the central portion, there are formed grooves which constitute flow paths 115. The valve chamber in which the valve main body 113 is located communicates with the fuel cell main body located above via these flow paths 115 and the valve chamber communicates also with a plug coupling portion below in which the plug is coupled via these flow paths 115.

A compression helical spring 116 is provided about the outside of the valve head 113a with its lower end portion being in abutting engagement with the valve head 113a and with its upper end portion being pressed by a spring pressing member 116a provided in the upper end portion of the socket member 111. The guide portion 113c of the valve main body 113 is mounted in a central opening formed in the spring pressing member 116a.

By this arrangement, the valve main body 113 is always energized downwardly to close the valve by pressing the O ring 114 located in the O ring groove 113d of the valve head 113a to the valve seat 112a for sealing and to open the valve by separating the O ring 114 from the valve seat 112a against the force of the spring 116.

A rubber holder 117 as an elastic holder is provided below the valve seat member 112 in a manner to cover the valve stem 113b which reciprocates through the valve guide portion 112b. The upper flange portion of the rubber holder 117 abuts against the valve seat member 112 and the central opening of the rubber holder 117 abuts against the outer periphery of the valve guide portion 112b and the inside of the central opening constitutes a flow path. A bellows portion is formed downwardly from the central opening. The bellows portion expands and contracts in a vertical direction owing to the shape and material of the bellows portion and thereby secures a flow path 118 in a sealed state.

A cylindrical housing 119 is provided outside of the rubber holder 117 and below the socket member 111 for forming a plug coupling space for coupling the plug P110. The socket member 111, the rubber holder 117 and the housing 119 are integrally connected to one another by a connecting cylinder 120 which is fitted from the outside of the lower end of the housing 119 on the outer peripheral surface. This connection is achieved firmly by, for connection with the socket member 111, fitting an engaging projection formed in the socket member 111 in an engaging recess formed in the connecting cylinder 120 and, for connection with the housing 119, by fitting a projection formed by cutting a part of the connecting cylinder 120 in U-shape and bending the cut portion inwardly to form a projection and fitting this projection in an engaging recess formed in the housing 119 and also by holding the flange portion of the rubber holder 117 tightly between the socket member 111 and the housing 119.

In the socket S110 constructed in the above described manner, the valve can be automatically closed and opened by operating the valve stem 113b of the valve main body 113 in accordance with coupling with the plug P110.

The main part of the plug P110 of the coupler 110 which is coupled with the socket S110 except for a part of component such as a spring is preferably made, in the same manner as in the socket S110, of a non-metal material such as polypropyrene (PP) and polyphenylene sulfide (PS), high density polyethylene (HDPE) and polystyrene (PS), super engineering plastics such as polyether ether ketone (PEEK) having a methanol-proof property and liquid crystal polymer (LCP) and general engineering plastics such as polyethylene terephthalate (PET), polybutylene terephthalate (PBT) and polyacetal (POM).

This plug P110 is mounted, as shown in FIGS. 10A and 11, on the outer periphery of the forward end portion of a nozzle N of an inner container in which methanol which is fuel of the fuel cell is contained. The plug P110 comprises a plug main body 131 of a cylindrical shape having substantially three steps which is held in position by a holding cap C which is screwed onto an outer container protecting the inner container. The upper portion 131a of the plug main body 131 has the smallest diameter and the lower portion 131c which continues to the middle portion 131b has the largest diameter.

In this plug main body 131, a projecting connecting portion 132 of a substantially cylindrical shape having the smallest diameter is formed projecting from the forward end portion of the plug main body 131 for being mounted in the connecting cylinder 120 constituting the plug connecting opening of the socket S110. In the forward end portion of this projecting connecting portion 132 is formed a seal recess 132a in which the lower end portion of the rubber holder 117 of the socket S110 is inserted and fitted. The central opening of the projecting connecting portion 132 has a diameter sufficient for receiving the valve stem 113b of the socket S110.

The middle portion 131b having an intermediate diameter of the plug main body 131 has a conical surface formed inside thereof which constitutes a valve seat 133.

In the inner periphery of the cylindrical portion having the largest diameter of the lower portion 131c of the plug main body 131 is inserted the nozzle N of the inner container via an O ring 134. By holding a stepped portion between the middle portion 131b and the lower portion 131c of the plug main body 131 with the holding cap C screwed onto the nozzle of the outer container housing the inner container, the plug main body 131 is attached to the container.

In the inside of the plug main body 131 is mounted a valve main body 135 which is composed integrally of a valve head 135a in the middle portion in the form of a disk having substantially a large diameter, a valve stem 135b projecting from the upper central portion of the valve head 135a and having a small diameter and a guide portion 135c projecting from the lower central portion of the valve head 135a and having a large diameter. The valve stem 135b is located in the projecting connecting portion 132 to reciprocate therein.

In the upper end portion of the valve head 135a of the valve main body 135, there is formed an O ring groove 135d opposite to the valve seat 133 and an O ring 136 is mounted in the O ring grove 135d.

The valve stem 135b and the valve guide portion 135c are formed in their side surfaces with grooves which constitute flow paths 137 which communicate with the inside container via the lower valve guide portion 135c and communicate with the inside of the socket S110 which is coupled via the upper valve stem 135b.

For guiding reciprocal movement of the valve main body 135, a valve holder 138 having a substantially cylindrical shape is provided in a manner to enclose the outside of the guide portion 135c. The intermediate flange portion of the valve holder 138 is in abutting engagement with the end surface below the valve seat 133 of the middle portion 131b of the plug main body 131 and the O ring 134 of the inner container is in abutting engagement with the lower surface of the flange portion and the valve holder 138 is screwed onto the screw portion on the inner periphery of the valve main body 131.

A helical compression spring 139 is mounted on the outer periphery of the guide portion 135c of the valve main body 131 with its upper end portion being in abutting engagement with the valve head 135a and with its lower end portion being held by the intermediate projection of the valve holder 138.

By this arrangement, the valve main body 135 is always energized upwardly to close the valve by pressing the O ring 136 located in the O ring groove 135d of the valve head 135a to the valve seat 133 for sealing and open the valve by separating the O ring from the valve seat against the force of the spring 139.

In the lower side wall of the valve holder 138 is formed a flow path opening 138a to communicate with the inner container.

In the plug P110 constructed in this manner, the valve can be automatically closed and opened by operating the valve stem 135b of the valve main body 135 with coupling of the socket S110.

In this coupler 110, for enabling coupling of the socket S110 and the plug P110 of, e.g., a specific fuel concentration by discriminating them, a key and a key groove are provided as discrimination means. The key is provided in one of the socket S110 and the plug P110 and the key groove is provided in the other.

By performing coupling by using the key and the key groove as the discrimination means, discrimination can be made against the socket and the plug which cannot be coupled but, when force to rotate the socket S110 relative to the plug P110 about their central axis is applied, such rotation is restricted by the key and the key groove and this is likely to damage either the key or the key groove depending upon the magnitude of the force.

In this coupler 110, therefore, damage due to an excessive rotational force is prevented by enabling the key to rotate about the central axis.

In this coupler 110, as shown in FIG. 10A, a key groove 151 as a discrimination means 150 is formed in the coupling direction in the outer side surface portion of the projecting connecting portion 132 of the plug main body 132 of the plug P110. The key groove is formed in two diagonal positions (only one is shown in FIG. 10A in a length corresponding to the distance of coupling from the foremost end.

On the other hand, a key 152 which is fitted in the key groove 151 is integrally formed in the inner peripheral side of an annular key ring 153 which constitute the ring member in a manner to project in correspondence to the position of the key groove 151. This key ring 153 is disposed at the lower end of the housing 119 of the socket 5110 and held by a caulked portion 120a formed at the lower end of the connecting cylinder 120 in such a manner that the key ring 153 can rotate about the central axis.

Accordingly, by fitting the key 152 formed in the key ring 153 mounted in the socket S110 in the key groove 151 of the plug P110, the socket S110 and the plug P110 can be discriminated.

Disposition of the key groove 151 and the key 152 is not limited to diagonal positions (positions of 180 degrees) but disposition at other different angle may be adopted or combinations of different shapes such as different widths and depths of the key groove and the key may be adopted so that a key groove and a key of a small size will not be fitted in a key groove and a key of a large size. Thus, by combining these, many types of the socket and the plug can be discriminated.

When an excessive rotational force to rotate the socket S110 and the plug P110 relative to each other about the central axis is applied, the key ring 153 is rotated and an excessive force is not applied to the socket S110 and the plug P110 and, therefore, damage or destruction can be prevented while the coupled state is maintained.

In this coupler 110, a coupling holding means 160 for holding coupling between the socket S110 and the plug P110 is provided. One part of the coupling holding means 160 is made of an engaging portion 161 and a counterpart of the coupling holding means 160 is made of an elastic engaging member 162. By inserting and pulling out the engaging portion 161 in a manner to override in straight direction and deform the elastic engaging member 162, coupling can be achieved by engagement of the engaging portion 161 with the elastic engaging member 162 and coupling can be released by pulling out the engaging portion 161.

In this coupler 110, a horizontal annular engaging groove is formed as the engaging portion 161 in the outer periphery of the upper portion of the projecting connecting portion 132 of the plug main body 131 of the plug P110 and the foremost end portion of the projecting connecting portion 132 is formed in an arcuate curved surface.

On the other hand, the elastic engaging portion 162 provided in the socket S110 is formed by a snap ring which is made by forming a spring material in substantially a U-shape with its opposite portions narrowing inwardly. As shown in FIG. 10B, a snap ring mounting groove 163 is formed integrally in the foremost end portion of the housing 119 and the elastic engaging portion 162 is mounted in the groove 163 so that it is held at the opening end portions and the U-shaped middle portion thereof and the opposite side portions are elastically deformed to open and close.

Therefore, by providing this coupling holding means 160, when the plug P110 is inserted in the socket S110, the foremost end portion of the projecting connecting portion 132 of the plug P110 is inserted in a manner to expand the snap ring which constitutes the elastic engaging portion 162 and, as the projecting connecting portion 132 is inserted to the engaging portion 161, the snap ring is narrowed and engaged in the engaging groove and coupling between the socket S110 and the plug P110 is thereby maintained.

Conversely, when the plug P110 is pulled out of the coupled state, the snap ring constituting the elastic engaging portion 162 is deformed in an expanding manner and is disengaged from the engaging groove of the engaging portion 161 and the plug P110 can be separated from the socket S110.

According to this coupler 110, since the key groove 151 is provided in one of the socket S110 and the plug P110 and the key 152 which is fitted in this key groove 151 is provided in the ring member 153 which is provided in the other of the socket S110 and the plug P110, discrimination of the socket S110 and the plug P110 can be made by the key groove 151 and the key 152 and, moreover, when an excessive rotational force exceeding a normal range of use is applied, action of an excessive force can be prevented by rotation of the ring member 153.

By this arrangement, a predetermined set of the plug and socket can be accurately selected for coupling in supplying methanol in a container to a methanol fuel cell or exchanging a container per se and, in addition, damage due to an excessive rotational force can be prevented.

Further, according to this coupler 110, since the coupling holding means 160 for holding coupling of the socket S110 and the plug P110 is provided between the socket S110 and the plug P110, coupling of the socket S110 and the plug P110 can be accurately maintained.

According to this coupler 110, the coupling holding means is composed of the engaging portion 161 provided in one of the socket S110 and the plug P110 and the elastic engaging member 162 which is fitted in the engaging portion 161 is provided in the other and, therefore, engagement with the engaging portion 161 can be achieved by pushing the elastic engaging member 162 into the engaging portion 161 by utilizing elastic deformation of the elastic engaging member 162 and coupling can thereby be maintained and coupling can be released easily by pulling out the elastic engaging member 162.

Further, according to this coupler 110, since the key groove 151 and the key 152 are provided as the discrimination means 150 for discriminating the plug P110 and the socket S110, by changing shape (combination of width and depth or the like), disposition and number of the key groove 151 and the key 152, the plug P110 and the socket S110 can be discriminated in a simple manner.

A projection and a recess or the like means may be provided between contact surfaces of the key ring 153 which constitutes the ring member and the housing 119 or the connecting member 120 by which the key ring 153 is rotatably supported so that the projection and recess will function as rotation resisting means for resisting rotation when the key ring 153 is immobilized and enabling it to rotate when an excessive rotational force is applied. By this arrangement, in coupling of the socket S110 and the plug P110, the key ring 153 is immobilized and its rotation is restricted whereby connection between the key groove 151 and the key 152 can be made easily in a standstill state of the key ring 153 and when an excessive rotational force is applied, the key ring 153 is rotated by overriding of the projection from the recess and thereby damage can be prevented.

Another embodiment of the invention and a modified example of this embodiment will be described with reference to FIGS. 12A-D; 13 and 14A-B. The same component parts as those of the above described embodiments will be designated by the same reference characters and description will be omitted.

Figure 12A:
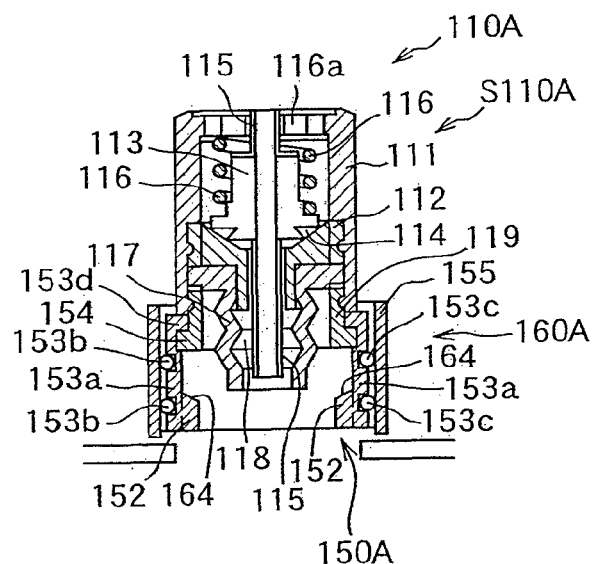
FIG. 12A shows one embodiment of the coupler of the invention which is a vertical sectional view and FIG. 12C is a partial perspective view of the socket.
Figure 12C:
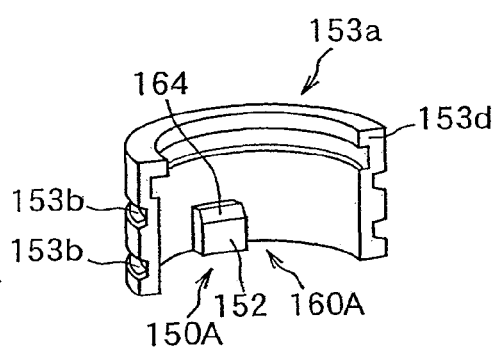
Figure 12B:
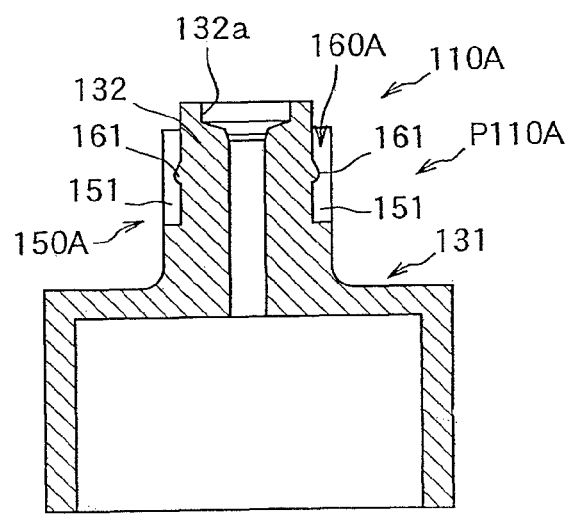
FIG. 12 is a vertical sectional view and FIG. 12D a perspective outside view of the plug.
Figure 12D:
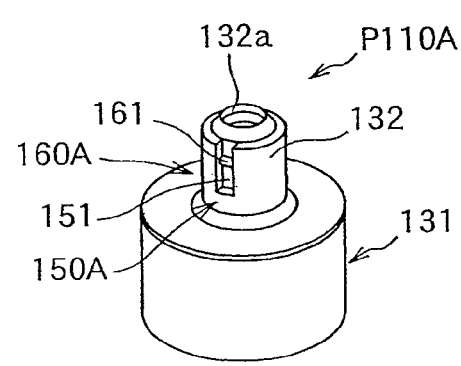
Figure 13:
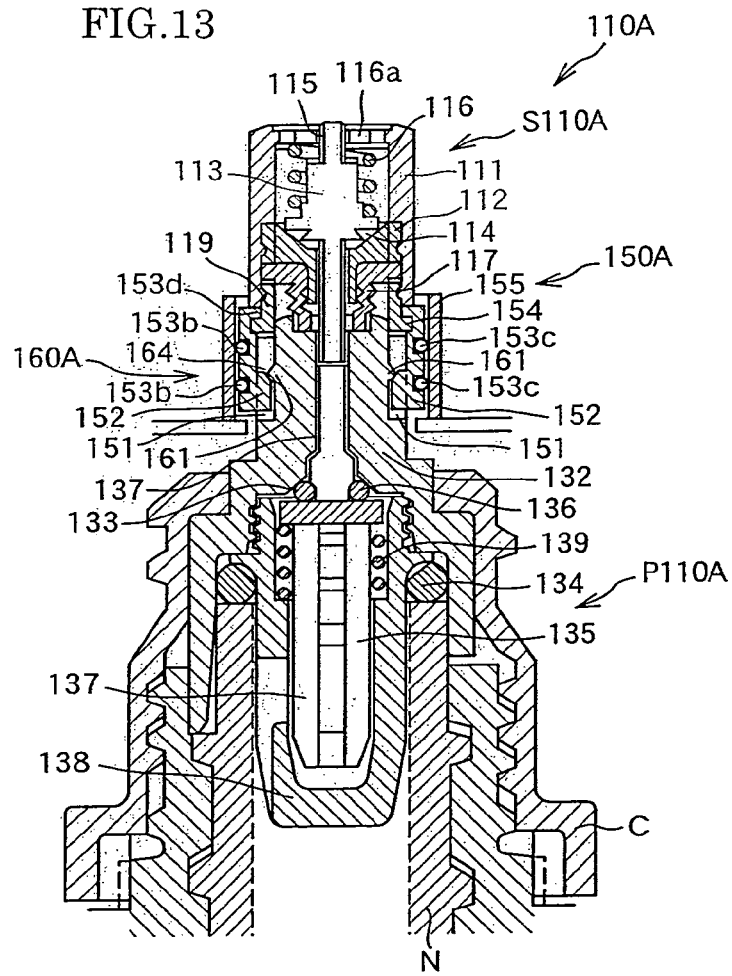
FIG. 13 is a vertical sectional view of the embodiment of the coupler of the invention in a fitted and coupled state.
Figure 14A:
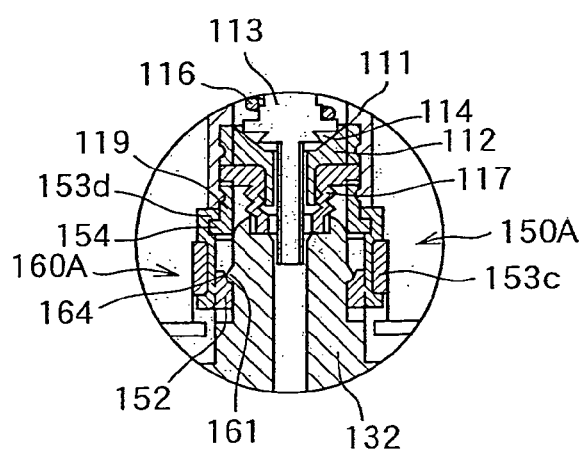
FIG. 14A is a partial vertical sectional view of the coupler of the invention and FIG. 14 B is a plan view of a modified example of the embodiment of the coupler of the invention.
Figure 14B:
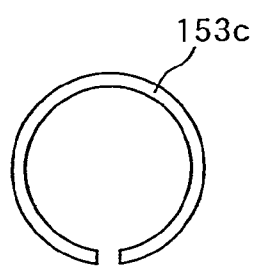
Figure 17A:
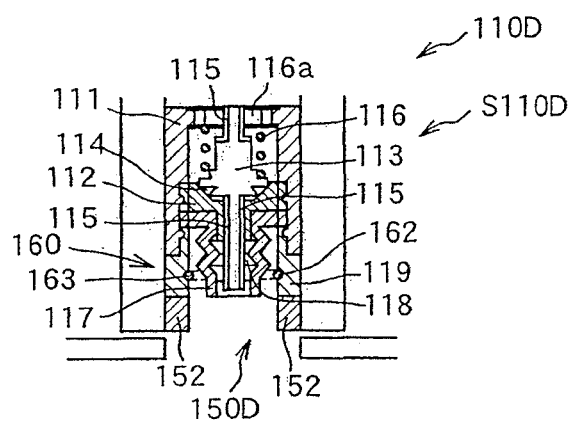
FIG. 17A shows one embodiment of the coupler of the invention which is a vertical sectional view of a socket and FIG. 17C is a vertical sectional view of a plug in separated state and FIG. 17D is a perspective view of a plug main body and FIG. 17B is a key ring on the plug side.
Figure 17B:
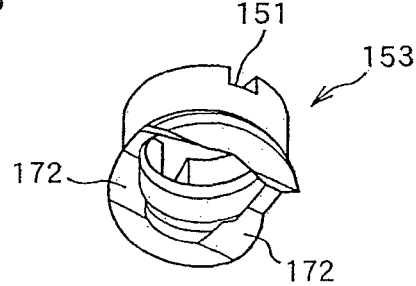
Figure 17C:
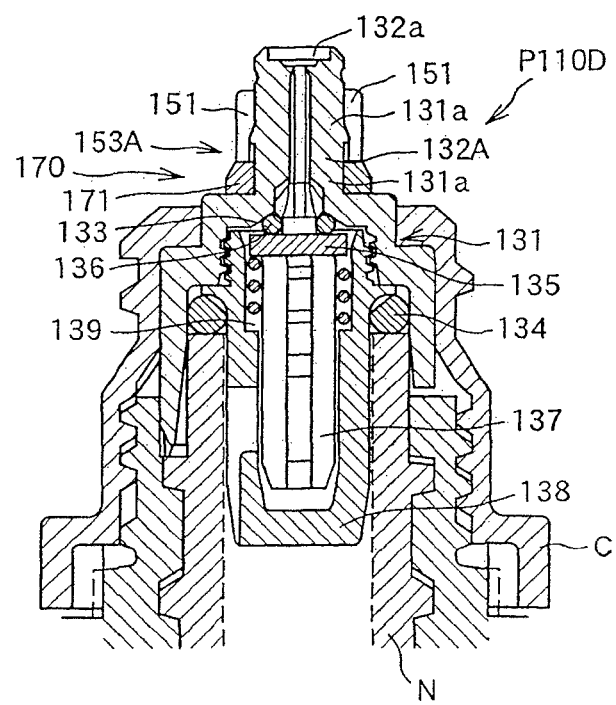
Figure 17D:
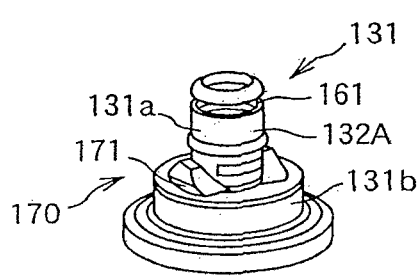

FIGS. 12A-D and 14A show an embodiment of the coupler of the invention. FIG. 12A is a vertical sectional view and a partial perspective view of the socket and FIG. 12B is a vertical sectional view and a perspective view of the plug. FIG. 13 is a vertical sectional view of a coupled state. FIGS. 14A and B are a partial vertical sectional view and a plan view of a modified example.

In this coupler 110A, a key groove 151 and a key 152 of a discrimination means 150A for discriminating the socket S110A and the plug P110A are concurrently used as a coupling holding means 160A. The structure of the valve etc. is the same as the one of the above described embodiment.

In this coupler 110A, as shown in FIG. 12A, the key groove 151 as the discrimination means 150A is formed in the coupling direction in the outer peripheral surface portion of a projecting connecting portion 132 of a plug main body 131 of the plug P110A. The key groove is formed in two diagonal positions in a length corresponding to the distance of coupling from the foremost end.

In this key groove 151, an engaging projection is formed as an engaging portion 161 of the coupling holding means 160A.

The engaging portion 161 has a substantially horizontal lower end surface and a side surface which is an inclining surface narrowing toward the top.

The key 152 which is fitted in the key groove 151 is formed integrally on each of the inner periphery of key ring members 153a, 153a which are divided in two and constitute a ring when they are combined together in such a manner that the key 152 projects at a position corresponding to the position of the key groove 151. The key rings 153a, 153a are formed in upper and lower portions of the outer periphery thereof with connecting grooves 153b and are combined to a ring by attaching elastic connecting means 153c such as a rubber ring in the connecting grooves 153b in a state in which the key rings 153a, 153a contact each other in such a manner that the ring can expand outwardly to some extent. The key rings 153a, 153a are formed with flange portions 153d which project from the inner periphery of the upper end portions. The flange portions 153d are supported by supporting flange portions 154 which are formed integrally with the housing 119 of the socket S110A in a manner to project from the lower end portion of the housing 119. The flange portions 153d are mounted on the supporting flange portions 154. rotatably about the central axis. For restricting outward expansion of the key rings 153a, 153a against the elastic connecting means 153c such as rubber rings, an annular support ring 155 is provided on the outside of the key rings 153a, 153a with a gap between it and the key rings 153a, 153a. The support ring 155 is mounted in the housing 119 of the socket S110A.

For restricting outward expansion of the key rings 153a, 153a, instead of using the support ring 155, as shown in FIG. 13, the elastic connecting means 153c mounted on the outer peripheral surfaces of the key rings 153a, 153a which are divided in two may be replaced by a metal ring formed as a C-shaped band and, in this case, the support ring can be omitted.

Since the key 152 formed on the key rings 153a, 153a is used as the discrimination means 150A and is concurrently used as the engaging portion 164 of the coupling holding means 160A, the upper end surface of the key 152 is shaped reversely to the engaging projection as the engaging portion 161.

Therefore, in the coupler 110A constructed in this manner, by fitting the key 152 formed on the key rings 153a, 153a mounted on the socket S110A in the key groove 151 of the plug P110A, a combination of the socket S110A and the plug P110A which cannot be coupled together can be discriminated.

Disposition of the key groove 151 and the key 152 is not limited to diagonal positions (positions of 180 degrees) but disposition at other different angle may be adopted or combinations of different shapes such as different widths and depths of the key groove and the key may be adopted so that a key groove and a key of a small size will not be fitted in a key groove and a key of a large size. Thus, by combining these, many types of the socket and the plug can be discriminated.

Further, in this coupler 110A, since the engaging portion 161 of the key groove 151 and the key 152 are concurrently used as the coupling holding means 160A, when the plug P110A is inserted into the socket S110A in a manner to push the plug P110A into the socket S110A, the engaging projection which is the engaging portion 161 of the plug P110A overrides the key 152 of the socket S110A and thereafter engagement of each other is brought about and coupling thereby is maintained. When the plug P110A is pulled out of the socket S110A, the engaging portion which is the engaging portion 161 of the plug P110A overrides the key 152 of the socket S110A and engagement of each other is released and coupling is thereby released. In overriding of the engaging portions 161 over the key 152, the key rings 153a, 153a are deformed in a manner to expand outwardly and smooth overriding thereby is achieved and coupling and decoupling can be facilitated.

By providing the discrimination means 150A and the coupling holding means 160A in the key groove 151 and the key 152, installation space can be easily secured and the coupler 110A can be made in a compact design.

When an excessive rotational force about the central axis to rotate the socket S110A relative to the plug P110A is applied in the coupled state, the key rings 153a, 153a are rotated and, therefore, an excessive force is not applied to the socket S110A and the plug P110A and damage and destruction can be prevented while coupling is maintained.

When a bending force acting in an inclining direction to the central axis is applied between the socket S110A and the plug P110A in the coupled state, the key rings 153a, 153a can be deformed in a direction to expand against the outside connection holding means 153c such as a rubber ring and, therefore, an excessive force is not applied to the socket S110A and the plug P110A and damage or destruction can be prevented against the excessive bending force while the coupled state is maintained.

By this arrangement, in the case of supplying methanol in a container to a methanol fuel cell or exchanging a container per se, a predetermined set of the socket and the plug can be accurately selected for coupling and damage or destruction by an excessive rotational force or excessive bending force can be prevented.

This coupler 110A can perform the same function and effect as the above described coupler 110.

By providing, as the rotation resisting means for resisting rotation when the key rings 153a, 153a are immobilized and enabling them to rotate when an excessive rotational force is applied, the projection and recess or the like between the contact surfaces of the key rings 153a, 153a which constitute the ring members and the support flange portion 154 of the housing 119 by which the key rings 153a, 153a are rotatably supported, the key rings 153a, 153a are immobilized to prevent rotation in coupling the socket S110A with the plug P110A and, therefore, connection between the key groove 151 and the key 152 can be easily made in a standstill state whereas the key rings 153a, 153a are enabled to rotate by an overriding action of the projection and recess against an excessive rotational force and damage can be thereby prevented.

Another embodiment of the coupler of the invention will be described with reference to FIG. 15.

In this coupler 110B, connection holding means 160B is different from the coupler 110. An engaging projection as an engaging portion 161 having a substantially horizontal lower end surface is provided at a position slightly below the upper end of a projecting connecting portion 132 which is in an upper end portion 131a of a plug main body 131 of the plug P110B. The engaging projection is provided in the entire periphery other than the key groove 151 or at plural positions such as two or three positions with equal interval in the circumferential direction of the projecting connecting portion 132.

On the other hand, in the socket S110B, in correspondence to the horizontal lower surface of the engaging projection as the engaging portion 161, the upper end surface of a key ring 153 of discrimination means 150 is disposed to constitute an engagement receiving portion.

Other structure of the coupler 110B is the same as the above described coupler 110 and description will be omitted.

According to this coupler 110B, when the plug P110B is inserted into the socket S110B in a manner to push the plug P110B into the socket S110B, the engaging projection which constitutes the engaging portion 161 of the plug P110B as the coupling holding means 160B for holding coupling proceeds in sliding contact with the inner peripheral surface of the key ring 153 of the socket S110B in such a manner that the engaging projection is elastically deformed inwardly and, by overriding the key ring 153, the lower surface of the engaging projection as the engaging portion 161 is engaged with the upper surface of the key ring 153 whereby coupling is maintained. When the plug P110B is pulled out of the socket S110B, the engaging projection which constitutes the engaging portion 161 of the plug P110B is pulled back in sliding contact with the inner peripheral surface of the key ring 153 of the socket S110B in such a manner that the engaging projection is elastically deformed inwardly and is disengaged from the key ring 153 whereby engagement between them is released and coupling can be released. In the movement of the engaging portion 161 along the inner periphery of the key ring 153, elastic deformation of the engaging portion 161 is facilitated by the key groove 151 of the projecting connecting portion 132 and, therefore, coupling and decoupling can be facilitated by smooth deformation of the engaging portion 161.

Since the key ring 153 which is the ring member of the discrimination means 150 is concurrently used as the coupling holding means 160B, the number of component parts can be reduced as compared with a case where elastic engaging member such as a snap ring is used and, therefore, installation space can be easily secured and the coupler 110B can be made in a compact design.

This coupler 110B also performs the same function and effect as the above described coupler 110.

Another embodiment of the coupler of the invention will be described with reference to FIG. 16A-B.

In the couplers 110, 110A and 110B of the above described embodiments, description has been made about the case where the key groove is provided on the side of the plug P and the key ring which is a ring member in which the key is provided is provided on the side of the socket S. In this coupler 110C, the key is provided on the side of the socket S and the key groove is provided on the side of the plug P and, when an excessive rotational force is applied, this excessive force is released by rotation of a key groove ring having a key groove which is a ring member.

In the coupler 110C, as discrimination means 150C of the socket S110C and the plug P110C, a key 152 is formed in a manner to project from the inner peripheral side of a housing 119 connected to the lower end portion of the socket S110C. The key 152 is provided at, for example, two diagonal positions. In this housing 119, in the same manner as in the coupler 110, a snap ring mounting groove 163 of the coupling holding means 160 is formed and a snap ring 162 is mounted as an elastic engaging member in the groove 163.

On the other hand, in the plug P110C, a key groove ring 153A in the form of a generally cylindrical ring member is provided between the outer periphery of a projecting connecting portion 132A which is an upper end portion 131a of a plug main body 131 and the upper end surface of a middle portion 131b in such a manner that the key groove ring 153A is rotatable about the central axis. A key groove 151 corresponding to the key 152 is formed in vertical direction in the outer periphery of the upper portion of the key groove ring 153A.

In this plug P110C, for mounting the ring member on the side of the plug, the projecting connecting portion 132A which is the upper end portion 131a of the plug main body 131 is made in a small diameter and the outer diameter of the key groove ring 153A which is mounted on the outer periphery of the projecting connecting portion 132A is made the same as the outer diameter of the projecting connecting portion 132 of the above described embodiments.

Accordingly, also in this case where the key groove ring 153A is provided as the ring member formed with the key groove 151 in the plug P110C and the key 152 is provided in the socket S110C to constitute the discrimination means 150C, when an excessive force to rotate the socket S110C relative to the plug P110C about the central axis is applied in a state where the key 152 is fitted in the key groove 151 of the key groove ring 153A, the key groove ring 153A is rotated on the outside of the projecting connecting portion 132A whereby an excessive force is not applied to the socket S110C and the plug P110C and damage and destruction can be prevented while coupling is maintained.

Since the projecting connecting portion 132A is of a small diameter, it can be inserted easily into the socket S110C and, as a result, operability is improved and seal can be made easily.

By providing, between the key groove ring 153A as the ring member and the upper end surface of the middle portion 131b of the plug main body 131 on which the key groove ring 153A is rotatably supported, a projection and recess or the like as rotation resisting means for resisting rotation when the key groove ring 153A which is the ring member is immobilized and enabling rotation when an excessive rotational force is applied, in coupling the socket S110C with the plug P110C, connection of the key groove 151 and the key 152 can be made easily in a standstill state by immobilizing the key groove ring 153A and restricting rotation thereof whereas it can be rotated by an overriding action of the projection and recess against an excessive rotational force and damage thereby can be prevented.

Other structure is the same as that of the above described coupler 110, 110A and 110B and the same function and effect are performed.

Another embodiment of the coupler of the invention will be described with reference to FIGS. 17A-D; 18AB and 19AB.

In this coupler 110D, in the same manner as in the coupler 110C of the above described embodiment, the key is provided on the side of the socket and the key groove is provided on the side of the plug and, when an excessive rotational force is applied, a key groove ring having a key groove which is a ring member is rotated to release the excessive force and, in addition, a cam mechanism is provided for automatically releasing coupling.

In this coupler 110D, in the same manner as in the coupler 110C, as a discrimination means 150D of the socket S110D and the plug P110D, a key 152 is formed in a manner to project from the inner peripheral side of a housing 119 connected to the lower end portion of the socket S110D. The key 152 is provided at, for example, two diagonal positions. In this housing 119, in the same manner as in the coupler 110, a snap ring mounting groove 163 of the coupling holding means 160 is formed and a snap ring 162 is mounted as an elastic engaging member in the groove 163.

On the other hand, in the plug P110D, a key groove ring 153A in the form of a generally cylindrical ring member is provided between the outer periphery of a projecting connecting portion 132A which is an upper end portion 131a of a plug main body 131 and the upper end surface of a middle portion 131b in such a manner that the key groove ring 153A is rotatable about the central axis. A key groove 151 corresponding to the key 152 is formed in vertical direction in the outer periphery of the upper portion of the key groove ring 153A.

Accordingly, also in this case where the key groove ring 153A is provided as the ring member formed with the key groove 151 in the plug P110D and the key 152 is provided in the socket S110D to constitute the discrimination means 150D, when an excessive force to rotate the socket S110D relative to the plug P110D about the central axis is applied in a state where the key 152 is fitted in the key groove 151 of the key groove ring 153A, the key groove ring 153A is rotated on the outside of the projecting connecting portion 132A whereby an excessive force is not applied to the socket S110D and the plug P110D and damage and destruction can be prevented while coupling is maintained.

By providing, between the key groove ring 153A as the ring member and the upper end surface of the middle portion 131b of the plug main body 131 on which the key groove ring 153A is rotatably supported, a projection and recess or the like as rotation resisting means for resisting rotation when the key groove ring 153A which is the ring member is immobilized and enabling rotation when an excessive rotational force is applied, in coupling the socket S110D with the plug P110D, connection of the key groove 151 and the key 152 can be made easily in a standstill state by immobilizing the key groove ring 153A and restricting rotation thereof whereas it can be rotated by an overriding action of the projection and recess against an excessive rotational force and damage thereby can be prevented.

Further, in this coupler 110D, in a case where an excessive rotational force is applied, this excessive force is released by rotating the key groove ring 153A and, in addition, there is provided a cam mechanism 170 for automatically releasing coupling.

This cam mechanism 170 comprises, as shown in FIG. 17, cams 171 which are formed in a manner to project upwardly at diagonal positions of the upper end surface of a middle portion 131b of a plug main body 131 of the plug P110D. Each cam 171 is formed as an end surface cam having inclined surfaces on both sides and a flat surface in the middle portion of the cam. The cam 171 has a height which is sufficient for securing a lift amount for enabling release of coupling from a coupled state in which the engaging portion 161 of the plug P110D is engaged with the snap ring 162 of the socket S110D by the coupling holding means 160.

On the other hand, cam followers 172 which convert a movement in a rotational direction to a movement in axial direction following the cams 171 are formed as recesses of a shape corresponding to the shape of the cams 171 in the lower end surface of the key groove ring 153A.

Accordingly, as shown in FIG. 18A, when force is applied in a direction to rotate the plug P110D relative to the socket S110D about the central axis in a coupled state in which the key 152 is engaged with the key groove ring 153A, since rotation of the key groove ring 153A is restricted by the key 153, the plug P110D is relatively rotated on the inner peripheral side of the key groove ring 153A and the cam 171 is also rotated.

Figures 19A, 19B:
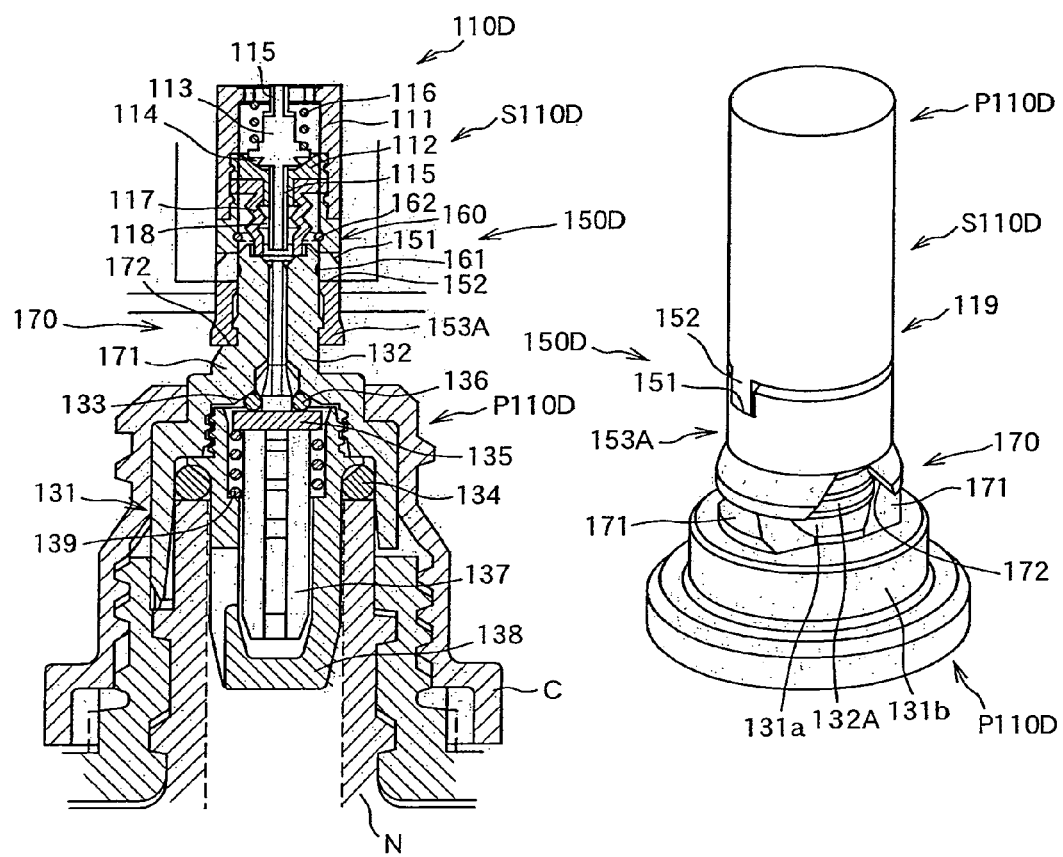
FIG. 19A is a vertical sectional view in a fitted and coupled state and FIG. 19B is a partial perspective view of one embodiment of the coupler of the invention.

By this movement, as shown in FIG. 19A, the key groove ring 153A in which the cam follower 172 is formed and which is in contact with the cam 171 is lifted in axial direction and, by the key groove ring 153A whose upper end surface is held by the lower end surface of a housing 119 of the socket S110D, the plug P110D is relatively pulled out of the socket S110D whereby coupling is released from the coupled state in which the engaging portion 161 of the plug P110D is engaged with the snap ring 162 of the socket S110D.

By this cam mechanism 170, therefore, when an excessive rotational force exceeding a normal range of use is applied, damage can be prevented by rotation of the key groove ring 153A and, in addition, an axial force is generated to release coupling automatically.

By this arrangement, when an excessive force exceeding a normal range of use is applied, the plug P110D can be disengaged from the socket S110D safely and automatically without damaging the coupler P110D or damaging devices of the main body.

Besides, in case the plug P110D is detached from the socket S110D by using this cam mechanism 170, force to separate them can be generated easily by applying a rotational force and they can be detached from each other.

Other structure is the same as that of the couplers 110, 110A, 110B and 110C and the coupler 110D performs the same function and effect as these couplers.

In the coupler 110D of this embodiment, the cam is integrally formed on the upper end surface of the middle portion of the projecting connecting portion of the plug P110D and the cam follower is provided in the key groove ring. Positions of the cam and the cam follower may be reversed.

In the couplers 110C and 110D of the above described two embodiments, the projecting connecting portion 132A is made in a small diameter and the key groove ring is rotatably provided on the outer peripheral surface of the projecting connecting portion 132A. In the couplers 110, 110A and 110B in which the key ring is provided on the side of the socket also, it is preferable that the foremost end portion of the projecting connecting portion 132 is made in a small diameter and the base portion of a large diameter has at least small and large two diameters for improving operability and sealing property relative to the socket S.

In this case, by setting the diameter of a large diameter portion of the plug P in correspondence to the inner diameter of the connecting portion of the socket S and thereby causing the large diameter portion of the plug P to slide in contact with the socket S in insertion for coupling, the inserting operation can thereby be guided and the central axis of the plug P and the socket S can be made coincidental to each other and, moreover, strength against an excessive force can be increased by the large diameter portion.

The diameter of the small diameter portion of the plug P should preferably be about 0.9 fold to 0.5 fold of the diameter of the large diameter portion from the point of view of operability.

The height of the large diameter portion should preferably be larger than length corresponding to a stroke necessary for an operation from contact of the tip end of the valve stem of the valve main body in the plug P with the valve stem of the valve main body in the socket S to completion of opening of the valve.

A recessed portion may be formed in the foremost end portion of the small diameter portion for enabling seal at the foremost end portion and the key or the key groove of the discrimination means may be provided in the large diameter portion.

In a case where the key ring is provided in the outside of the plug P, the diameter of this key ring may be made in a large diameter.

Further, positions of the key and the key groove provided in the socket and plug in the above described embodiments may be reversed, and positions of the engaging portion and its counterpart (engagement receiving portion) of the coupling holding means may also be reversed. The key and the key groove may be provided in the key ring and the key groove ring which are the ring member and the key groove and the key may be provided on the side of the fixed portion.

As to the use of these couplers, description has been made, by way of example, about coupling between a methanol container of a methanol fuel cell and a main body of the methanol fuel cell. The use of the couplers is not limited to this but they may be used for other purposes and these couplers are particularly suitable in a case where discrimination should be made among many types.

An embodiment of a fuel cartridge will now be described with reference to the accompanying drawings.

Figure 21A:
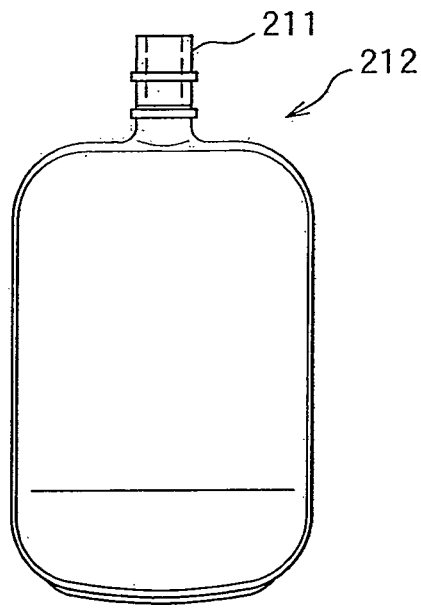
Figure 21B:
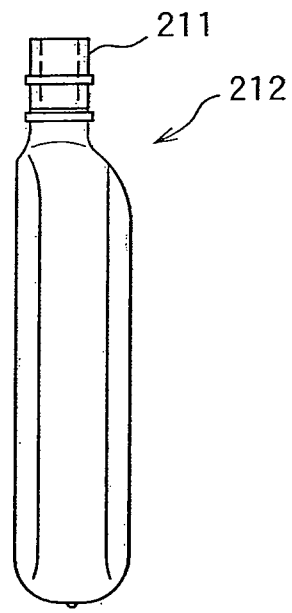
Figure 22:
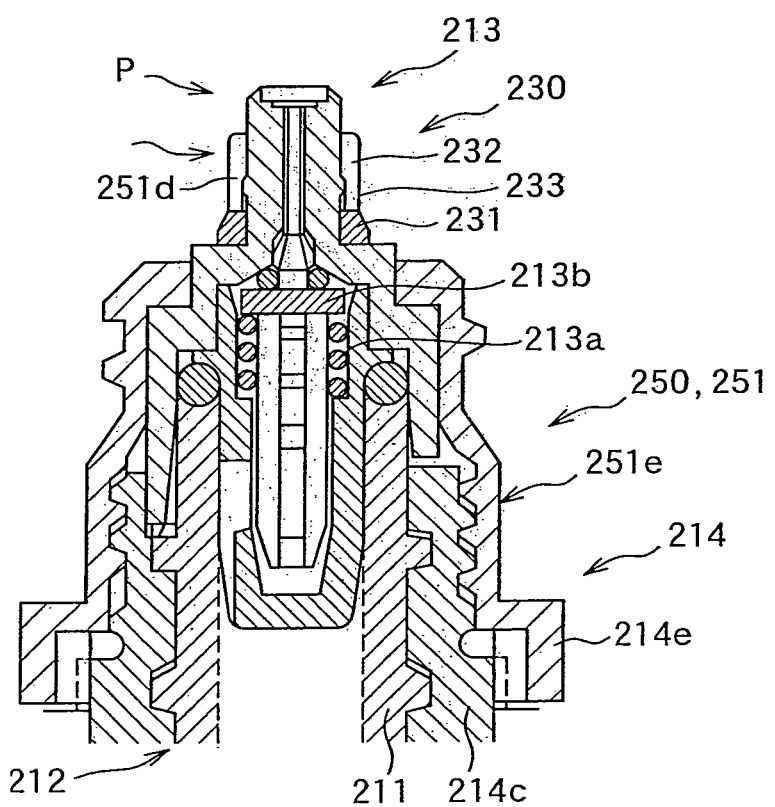
FIG. 22 is a general sectional view of a connector shown with the inner container received in an outer container of the embodiment of the fuel cartridge for a fuel cell of the invention.
Figure 24B:
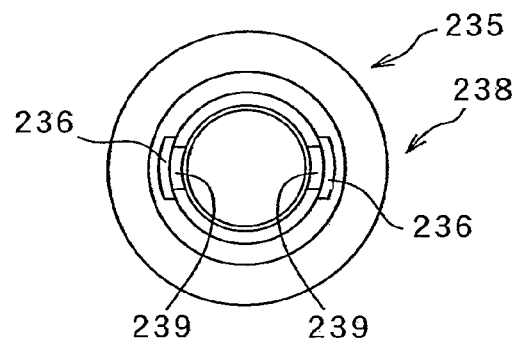
FIG. 24B is a plan view and FIG. 24C is a side view of a ring member of the liquid fuel discriminating means provided in the connector according to an embodiment of a fuel cartridge for a fuel cell.
Figure 24A:
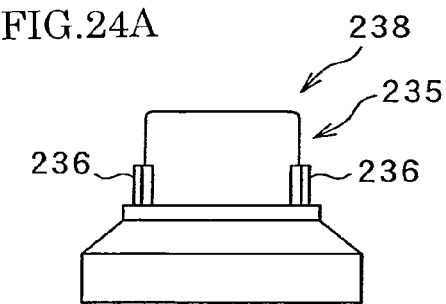
FIG. 24A is a front view.
Figure 24C:
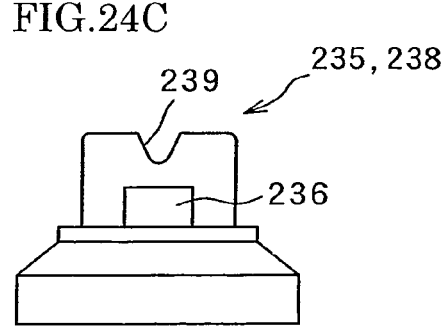
Figure 25A:
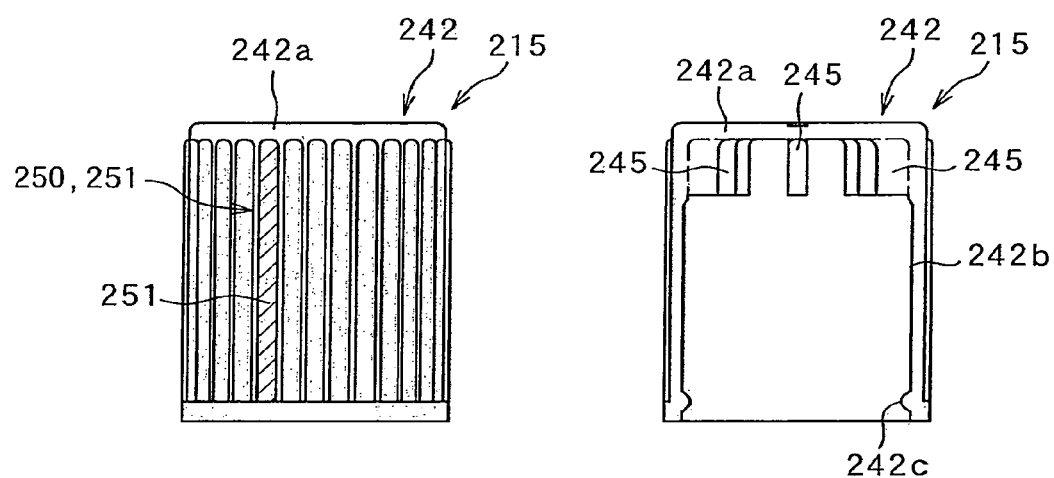
FIG. 25A is a front view and a sectional view of an outer cap and FIG. 25B is an inner cap of one embodiment of a fuel cartridge for a fuel cell.
Figure 25B:
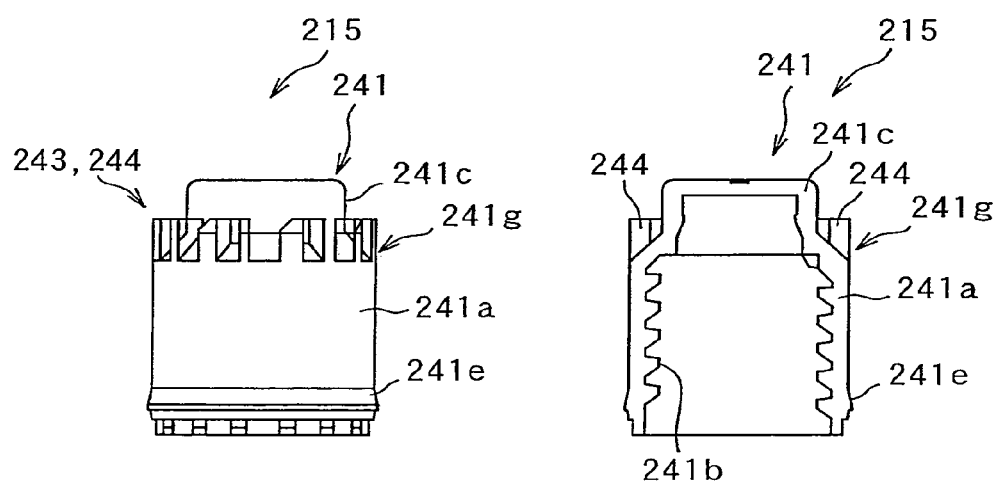
Figure 26A:
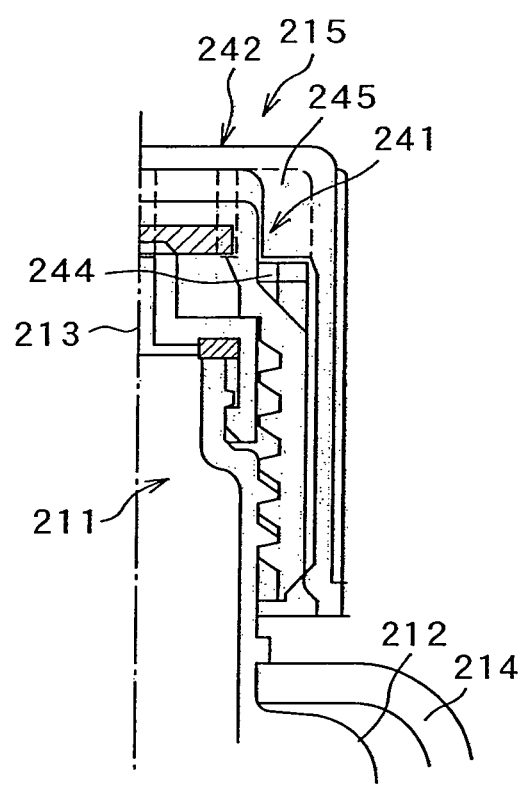
FIG. 26A is a sectional view showing an embodiment of a fuel cartridge for a fuel cell in an idle rotation state and FIG. 26B is a sectional view showing a rotating state provided with the outer cap and the inner cap.
Figure 26B:
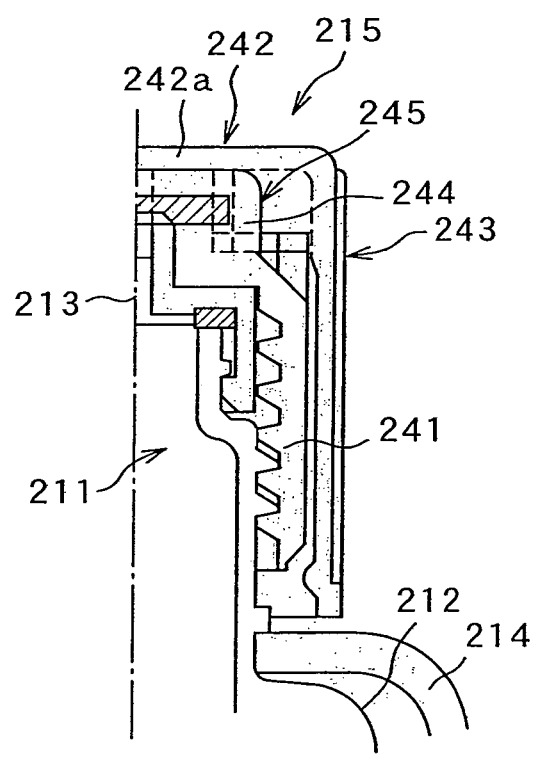

FIGS. 20A-B; 21 A-B; 22; 23 A-E; 24 A-C; 25 A-B and 26A-B show an embodiment of the fuel cartridge for a fuel cell of the invention. FIG. 20A is a front view and a vertical sectional view as a whole. FIG. 21A is a front view and FIG. 21B a side view of an inside container. FIG. 22 is a general sectional view of a connector shown with the inner container received in an outer container. FIGS. 23A-E are explanatory views illustrating a cam mechanism provided in the connector and a general perspective view of a connector on the side of a fuel cell main body. FIGS. 24A-C are a front view, a plan view and a side view of a ring member of the liquid fuel discriminating means provided in the connector. FIG. 25A and FIG. 25B are a front view and a sectional view of an outer cap and an inner cap. FIG. 26A is a sectional view showing the fuel cartridge in an idling state and FIG. 25B is a sectional view in a rotating state provided with the outer cap and the inner cap.

In this fuel cartridge 210 for a fuel cell, fuel is supplied through a connector which is detachably attached to a fuel tank of the fuel cell. The fuel cartridge 210 can be applied to both of a passive system in which fuel is supplied directly by pushing out a liquid fuel from the fuel cartridge and an active system in which the fuel cell main body has a pump unit and liquid fuel is supplied by sucking it from the fuel cartridge.

In both of the passive system and the active system, the fuel cartridge 210 comprises component parts which consist at least of an inner container 212 as a main body container housing liquid fuel and having a connection nozzle section 211, a connector 213 being provided in the connection nozzle section 211 of the inner container 211, capable of being detachably connected to the fuel tank of the fuel cell main body, and comprising liquid fuel discrimination key means 235, an outer container 214 having rigidity and housing the inner container 212 and a cap 215 provided in either the outer container 214 or the inner container 212 covering and sealing the connection nozzle section 211 of the inner container 212.

The fuel cartridge may be constructed by omitting the outer container and using the inner container as the main body container.

For example, the fuel cartridge 210 of the passive system comprises at least the inner container 212 as the main body container made of plastic housing liquid fuel and being capable of contraction and having the connection nozzle section 211, the connector 213 being provided in the connection nozzle section 211 of the inner container 211, capable of being detachably connected to the fuel tank of the fuel cell main body, and comprising the liquid fuel discrimination key means 235, the outer container 214 having rigidity and housing the inner container 212 and being capable of pushing the inner container 212 to contract and thereby push out the liquid fuel, and the cap 215 provided in either the outer container 214 or the inner container 212 and covering and sealing the connection nozzle section 211 of the inner container 212.

The inner container 212 as the main body container housing fuel is formed as a plastic bottle made of a synthetic resin which has corrosion-proof and barrier properties against methanol which is the fuel and contracting property and squeezable property necessary for pushing out methanol. The inner container 212 has, for example, an oval shape having a generally flat cross-section.

In the active system, the inner container as the main body in the case of sucking by the pump unit has only to contain methanol as the fuel and has only to be formed in the form of a bag having corrosion and barrier properties against methanol and need not have a shape of a cross section by which operation space for a push button to be described later can be secured with the connection nozzle section 111 and an offset bottle main body but the inner container has only to contract by suction.

As the synthetic resin material of the inner container 212, olefin type resin, for example, is suitable having regard to its barrier property against methanol. A bottle having a single layer or a plurality of layers made of such synthetic resin can be used.

In a case where the outer container is omitted and the fuel cartridge is made by the inner container as the main body container, polyester resin is preferable because the container itself is directly operated. As the polyester resin can be cited PET used by itself, PEN (polyethylene naphthalate) used by itself or PET/PEN mixed resin. A bottle made of polyethylene type resin can be produced at a higher production speed than a direct blow forming by forming a preform and forming it to a bottle by a biaxial drawing blowing forming.

In this inner container 212, the connecting nozzle section 211 of a smaller diameter is formed in a manner to project form the upper end portion of the inner container 212 and a coupler is mounted on the connection nozzle section 211 as the connector 213 which is detachably connected to the fuel cell main body.

The coupler as the connector 213 is composed of the plug P and the socket S which constitute a pair of engaging projection and recess which can be detachably connected to each other. For example, on the side of the fuel cartridge 210, the plug P which is an engaging projection is connected to the connection nozzle portion 211 of the plastic bottle 212 and the socket S which is an engaging recess is provided on the fuel cell main body. A valve 213b which is energized by a spring 213a is provided as the valve mechanism in each of the plug S and the socket S so that they can communicate with each other and fuel can flow out in a state in which they are mounted on and connected to each other and can be closed in a state in which they are separated and disengaged.

In this coupler 213, a connection holding means 220 is provided for holding connection between the socket S and the plug P. For example, one side of the connection holding means 220 is provided in the foremost end portion of the plug P as an engaging recess 211 and the other side of the connection holding means 220 is formed as an engaging projection 222 by providing an elastically deformable member in the socket S. They can be connected and disconnected by an overriding action in a straight direction. They can be connected by a single action of pushing for coupling and this coupling can be released by a single action of pulling out.

Further, in this coupler 213, when an excessive rotational force (forcibly rotating force) exceeding a normal range of use is applied about the central axis of the socket S and the plug P, there is likelihood of damage to the coupler 213 and devices of the main body and, therefore, a releasing means 230 is provided.

This releasing means 230 is made, for example, of a cam mechanism. A cam 231 is provided in the plug main body and a cam follower 233 is provided in a cam ring 232. A key 236 and a key groove 237 which constitute liquid fuel discrimination means 235 are provided between the cam ring 232 and the socket S on the main body of the fuel cell in such a manner that they are rotated together. By this arrangement, when an excessive rotational force is relatively applied, the rotational force is converted to a separating force in the direction of insertion and detaching whereby coupling between the plug P and the socket S can be automatically released.

In this connector 213, there is provided a discrimination function to connect only a predetermined set of the socket S and the plug P by changing the size (vertical and lateral lengths and depth) and number (the illustrated example showing a case of one key) of the key 236 and the key groove 237 constituting the liquid fuel discrimination means 235.

Disposition of the liquid fuel discrimination means 235 is not limited to the above described example in which it is provided in the cam ring 232 of the releasing mechanism 230 which is a separate component part from the connector 213 but the fuel discrimination means 235 may be provided integrally with the connector 213.

Further, as shown in FIGS. 24 A-C, a ring member 238 in which keys 236 only are formed may be attached to the connector 213. In this ring member 238, V-shaped grooves are formed from the upper end surface of the ring member 238 in positions corresponding to the positions of the keys 236 as a display means 239 for displaying positions of the keys 236.

As the display means 239, not only the V-shaped groove but it may be formed as a groove or recess of a various shapes such as a U-shaped groove and a semicircular-shaped groove. The groove is not limited to a single groove but a plurality of grooves may be formed in about the same range as the width of the key 236. The display means 239 is not limited to the groove or recess from the upper end surface of the ring member 238 but display may be made by forming a groove or recess in the side surface portion.

The positions of the key and the key groove of the liquid fuel discrimination means may be reversed.

The plastic bottle 212 as the inner container is housed in the outer container 214 which has rigidity and houses the inner container 212 and is capable of pushing and thereby contracting the inner container 212 to push out the liquid fuel.

This outer container 214 is formed as a hard case which is divided in two, i.e., a front portion and a rear portion so that it can house the plastic bottle 212 which is the inner container. A push button 214b is provided in the front portion 214a in such a manner that the push button 214b can be pushed down by pivoting about the lower end portion. In the outer container 214, there is also provided a projecting outer nozzle portion 214c covering the connection nozzle section 211 of the plastic bottle 212. The outer nozzle portion 214c is divided in two, one for the front portion 214a and the other for the rear portion 214d. An outer nozzle cap 214e is screwed onto the outer peripheral screw portion of the outer nozzle portion 214c to connect the divided two portions and cover the outer periphery of the connection nozzle section 211 to protect the connection nozzle section 211.

Accordingly, by housing the plastic bottle which is the inner container 211 in the outer container 214, joining and closing the 2-divided front portion 214a and the rear portion 214d and then screwing the outer nozzle cap 214e, substantially the entire plastic bottle 212 is housed with only the plug P as the coupler 213 which is the connector is exposed. In this state, by pushing the push button 214b of the outer container 214 after the plug P is connected to the socket S of the fuel cell main body, the front portion of the body of the inner container 212 is pressed to cause fuel to flow out of the plastic bottle 212 and be supplied t the fuel cell main body through the socket S.

As the outer container of the active system in which fuel is sucked by the pump unit, it will suffice if the outer container is one which can house the plastic bottle which is the inner container containing methanol which is the fuel and it is not necessary to provide the push button in the outer container.

The cap 215 is provided on the outside of the outer nozzle cap 214e of the outer container 214 to cover and sealingly close the inner container 212 and the outer container 214.

This cap (safety cap) 215 is composed of an inner cap 241 and an outer cap 242 respectively made of synthetic resin, The inner cap 241 covers the outer nozzle cap 214e and is screwed onto the outer nozzle cap 214e by means of the screw portion in the base portion to sealingly close it. The outer cap 242 covers the inner cap 241 and is mounted thereon rotatably and also slidably within a limited distance in axial direction. By an operation to push down and rotate the outer cap 242, it can be rotated integrally with the inner cap 242 whereas by rotation only of the outer cap 242, it is rotated in idle rotation. By this arrangement, the cap 215 can function as a safety cap having a child resistance effect.

The inner cap 241 of this safety cap 215 is formed, as shown in FIGS. 20 and 21, generally in the form of a two-stepped cylinder having a bottom and this bottom is used as a ceiling of the inner cap. In the inner periphery of a large diameter cylindrical portion 241a of the inner cap 241 is formed a screw portion 241b which is screwed onto the screw portion of the outer nozzle cap 214e of the outer container 214.

A stepped portion 241g in a conical shape is formed on the outside of the large diameter portion 241a and the small diameter portion 241c of two-stepped cylinder. In this stepped portion 241g, there are provided a plurality (eight in the illustrated example) of ratchet teeth 244 of a ratchet mechanism 245 at an equal interval in the circumferential direction. The ratchet mechanism 243 constitutes the mechanism which enables the integral operation of the outer cap 242 with the inner cap 241 by the pushing down and rotation of the outer cap 242 and enabling idle rotation of the outer cap 242 by rotation only of the outer cap 242.

The outer cap 242 which covers this inner cap 241 is formed, as shown in FIGS. 20 and 22, in a cylindrical shape having a bottom and this bottom is used as the ceiling of the outer cap 242. A movement restricting portion 242c is provided in the inner periphery of the lower end portion of the cylindrical portion 242b for restricting the axial movement of the outer cap 242 within some distance to enable the outer cap 242 to be rotated integrally with the inner cap 241 or to be rotated idly. The movement restricting portion 242c is formed in the shape of an inwardly projecting horizontal projection and is engaged with the inner cap 241 below an axial direction movement restricting portion 241e of the inner cap 241 whereby upward movement of the outer cap 242 is restricted. On the other hand, lower movement of the outer cap 242 is restricted by abutting of its ceiling 242a with the ceiling of the inner cap 241 and, therefore, the outer cap 242 can move vertically between them (see the upper end position of FIG. 20A and the upper end position of FIG. 20B.

In the outer cap 242, there are provided a plurality of ratchet pawls (eight in the illustrated example) of the ratchet mechanism 243 at an equal interval in the circumferential direction for enabling the outer cap 242 to rotate integrally with the inner cap 241 by the rotation and pushing down operation of the outer cap 242 and enabling the outer cap 242 to rotate idly by rotation only of the outer cap 242.

By this arrangement, in a state in which the outer cap 242 is pushed down, the ratchet pawls 245 are in meshing engagement with the ratchet teeth 244 of the inner cap 241 to enable the inner cap 241 to open or close.

In a state in which the outer cap 242 is not pushed down, the ratchet pawls 245 are located at upper surfaces of the respective teeth of the ratchet teeth 244 of the inner cap 241 and, even if the outer cap 242 is rotated, it is rotated in sliding along the ratchet teeth 244 and therefore is rotated idly without being connected with the inner cap 241.

Accordingly, if one attempts, for removing the safety cap 215, to rotate the outer cap 242 counterclockwise without pushing down the outer cap 242, the ratchet mechanism 243 rotates in idle rotation and the safety cap 215 cannot be removed from the fuel cartridge 210 by rotation of the inner cap 241. By this arrangement, a child resistance effect is performed and an erroneous removing of the safety cap 215 can be prevented whereby erroneous leakage or erroneous removal by a child of contents of the inner container 213 can be prevented.

In this ratchet mechanism 243, the ratchet pawls 245 merely slide along the ratchet teeth 244 in the case of idle rotation and, therefore, idle rotation torque can be reduced substantially to zero. For example, assuming that cap opening torque is about 30 cN·m to 40 cN·m, since the idling torque is substantially zero, the child resistance effect can be made clear.

In the fuel cartridge 210 for a fuel cell constructed in this manner, fuel of a type according to the use of the fuel cell such as pure methanol, methanol aqueous solution of a predetermined concentration and other fuel is contained in the plastic bottle 212 for use.

For discriminating the fuel cartridge 210 in a simple manner according to the type of the fuel, contents display means 250 according to the type of the fuel is provided on the outer surface portion or a portion which is exposed to the outside in use of the fuel cartridge 210.

As the contents display means 250, a colored portion or a Braille display portion or a combination thereof according to the type or concentration or other characteristics of the fuel is provided on at least one of the inner container 212, connector 213, outer container 214 and cap 215.

In a case where the colored portion 251 as the contents display means 250 is provided on the outer container 251, as shown in FIG. 20, it is formed as a colored portion 251a in the shape of a band and discrimination is made by the color. In this case, by applying the same color to the fuel cell main body, discrimination can be made accurately to confirm that the fuel in the container is a correct one.

In the case of providing the contents display means 250 on the outer container 214, the push button 214b may be colored to provide the contents display means 250. By preparing for the push buttons 214b of different colors, discrimination can be made while other component parts 212, 213, 214 and 215 can be made common. If the colored portion 251b of the push button 214b is formed as a transparent colored portion, it is preferable because the remaining amount of the fuel in the inner container 212 can be known from outside.

In a case where the contents display means 250 is provided on the cap 215, as shown in FIG. 25, for example, a colored portion 251c is provided on the outer cap 242 to color this portion for discrimination.

By providing the contents display means 250 on the outer surface portion of the fuel cartridge 210, the type (kind or concentration) of the fuel can be accurately known from the outside in a simple manner.

As a case where the contents display means 250 is provided on the surface which is exposed to the outside in use, for example, the cam ring 232 of the cam mechanism which constitutes the releasing means 230 may be colored as a colored portion 251d for discriminating the type of the fuel.

Particularly, in the case of the cam ring 232, by kneading a resin material containing a coloring agent in forming the cam ring 232, the cam ring 232 may be used as the contents display means 250. By preparing for the cam rings 232 having different colors, other component parts 211, 212, 213, 214 and 215 of the fuel cartridge can be made common while discrimination can be made. By this arrangement, discrimination can be made accurately immediately before supplying the fuel and, besides, this portion is one which does not directly come in contact with the fuel and, therefore, even if the coloring agent contains metal ion, the fuel will not be adversely affected by solving of the metal ion into the fuel.

The contents display means 250 can also be provided by coloring the outer nozzle cap 214e to form a colored portion 254e. By preparing for the outer nozzle caps 214e having different colors, other component parts 211, 212, 213, 214 and 215 can be made common while discrimination can be made and, in the same manner as in the case of the cam ring 232, discrimination can be made immediately before supplying of the fuel and solving of metal ion into the fuel can be prevented.

By providing the Braille display means 252 as the contents display means 250 in addition to the contents display means 250 by the colored portion, discrimination of the type of the fuel can be accurately made when a visually handicapped person handles the fuel cartridge.

Discrimination of the type of the fuel can be made by providing the contents display means 250 on the fuel cartridge. Particularly, it is most preferable to provide the cam ring 232 and, in the step of forming it, to provide the colored portion 251d by kneading a resin material containing a coloring agent, for, in this case, coloring according to the type of the fuel can be made easily and other component parts may be made common and, as a result, many types of the fuel can be made at a low cost. Besides, since the cam ring 232 does not come directly in contact with the fuel, there is no problem of solving of the metal ion into the fuel. Further, this is a part which is exposed to the outside immediately before connection to the fuel cell main body and, therefore, it draws attention of the user to accurately prevent an erroneous connection. Particularly, by providing the same colored portion on the socket S which is a coupler on the side of the fuel cell main body, an erroneous connection can be more accurately prevented for supplying the fuel.

In a case where, instead of the cam ring 232, the ring member formed with the key 236 only separately from the connector 213 is attached to the connector 213, the contents display means may be provided by coloring the ring member having the unillustrated key. In this case, in the same manner as in the key ring, the ring member does not come directly in contact with the fuel and there is no problem of solving of the metal ion into the fuel and, further, since this is a part which is exposed to the outside immediately before connection to the fuel cell main body, it draws attention of the user to accurately prevent an erroneous connection.

The contents display means may also be provided by coloring the key member such as the key and the key groove provided integrally with the connector 213.

The size etc. of the colored portion may be suitably determined depending upon the location of the colored portion. It will suffice if it is provided at a location which can be discriminated by persons such as the user.

INDUSTRIAL UTILITY

The coupler of the present invention can be coupled accurately by a simple operation in shifting liquid or the like from a container to a container on the main body side or exchanging the container per se and coupling can be released before damage occurs. The coupler is particularly suitable for a coupler provided between a cartridge container of a methanol cell and a fuel cell main body.

The fuel cartridge of this invention is a fuel cartridge for supplying liquid fuel to a fuel tank of a fuel cell main body. The fuel cartridge can discriminate the type or concentration of the fuel accurately in supplying and is particularly suitable for use as one for a methanol fuel cell.

The invention claimed is:

1. A coupler comprising a socket having a valve and energizing means for energizing the valve in a closing direction, and a plug having a valve and energizing means for energizing the valve of the plug in a closing direction, said plug being detachably fitted and coupled with the socket and being capable of communicating with the socket by opening the valve of the plug and the valve of the socket in the fitted and coupled state,
wherein a key groove or a key is provided in one of the socket and the plug, and a ring member having a key or a key groove which can be fitted with the key groove or the key is provided in the other of the socket and the plug, said ring member being rotatable about a central axis of connection of the socket and the plug wherein the ring member is divided in a plurality of portions in the circumferential direction and is provided with elastic connecting means for connecting and holding the divided portions of the ring member.

2. A coupler as defined in claim 1 wherein coupling holding means for holding coupling is provided between the socket and the plug.

3. A coupler as defined in claim 2 wherein the coupling holding means is provided between the key groove provided in one of the socket and the plug and the key provided in the other of the socket and the plug.

4. A coupler as defined in claim 1 wherein coupling holding means is provided between the ring member provided in one of the socket and the plug and the other of the socket and the plug.

5. A coupler as defined in claim 1 wherein coupling holding means comprises an engaging portion which is provided in one of the socket and the plug and an elastic engaging member which can engage with the engaging portion and is provided in the other of the socket and the plug.

6. A coupler as defined in claim 1 wherein discrimination means for discriminating the socket and the plug is provided between the key groove and the key.

7. A coupler as defined in claim 1 wherein rotation resisting means is provided between the ring member provided in one of the sockets and the plug and the other of the sockets and the plug, said rotation resisting means resisting rotation when said ring member is immobilized and being capable of being rotated when excessive rotational force is applied.

8. A coupler as defined in claim 1 wherein a cam mechanism is provided between the plug and the socket, said cam mechanism being capable of releasing the socket and the plug from coupling by rotating the coupled socket and the plug in relative rotation about a central axis.

9. A coupler as defined in claim 8 wherein a cam of the cam mechanism is made of an end surface cam and is provided on the side of the key groove or the key and a cam follower following the end surface cam is provided in the ring member on the side of the key or the key groove.

* * * * *